United States Patent
Panter

(10) Patent No.: US 10,899,176 B2
(45) Date of Patent: Jan. 26, 2021

(54) ARTICLE MOVEMENT SYSTEMS, BALL WHEELS AND RELATED APPARATUS AND METHODS

(71) Applicant: Panter, Inc., Orlando, FL (US)

(72) Inventor: Rodney P. Panter, Orlando, FL (US)

(73) Assignee: PANTER, INC., Orlando, FL (US)

( * ) Notice: Subject to any disclaimer, the term of this patent is extended or adjusted under 35 U.S.C. 154(b) by 0 days.

(21) Appl. No.: 16/564,710

(22) Filed: Sep. 9, 2019

(65) Prior Publication Data
US 2019/0389250 A1 Dec. 26, 2019

Related U.S. Application Data

(63) Continuation of application No. 16/246,938, filed on Jan. 14, 2019, now abandoned, which is a continuation of application No. 15/985,431, filed on May 21, 2018, now abandoned, which is a continuation of application No. 15/232,883, filed on Aug. 10, 2016, now Pat. No. 9,783,001, and a continuation of application No. 14/739,449, filed on Jun. 15, 2015, now abandoned, which is a continuation of application No. 12/718,063, filed on Mar. 5, 2010, now abandoned, which is a continuation-in-part of application No. 12/641,845, filed on Dec. 18, 2009, now abandoned.

(60) Provisional application No. 61/139,153, filed on Dec. 19, 2008.

(51) Int. Cl.
*B60B 33/08* (2006.01)
*B60B 33/00* (2006.01)
*B60B 19/14* (2006.01)

(52) U.S. Cl.
CPC .............. *B60B 33/08* (2013.01); *B60B 19/14* (2013.01); *B60B 33/0002* (2013.01); *B60B 33/0063* (2013.01); *B60B 33/0078* (2013.01); *B60B 2900/211* (2013.01); *B60B 2900/5112* (2013.01)

(58) Field of Classification Search
CPC .......................... Y10T 16/188; Y10T 16/1887
See application file for complete search history.

(56) References Cited

U.S. PATENT DOCUMENTS 9,783,001 B1 * 10/2017 Panter ................. B60B 33/0002

* cited by examiner

*Primary Examiner* — John D Walters
*Assistant Examiner* — James J Triggs
(74) *Attorney, Agent, or Firm* — Allen Dyer Doppelt & Gilchrist

(57) ABSTRACT

An article movement system includes an article and at least one ball wheel. The article has first and second article surfaces meeting at a first article edge. The ball wheel is located along the first article edge and includes a ball, a bearing arrangement and a shell. The ball engages a surface underlying the article, the bearing arrangement supports the ball for omni-directional rotational movement, and the shell is located along the first article edge and contains the ball and the bearing arrangement. The shell defines a non-circular ball opening through which a portion of the ball extends to contact the underlying surface. The article, the bearing arrangement and the shell are configured such that the ball wheel is able to support the article for omni-directional rolling motion over the underlying surface with either of the first and article surfaces parallel thereto, and at any orientation therebetween.

20 Claims, 20 Drawing Sheets

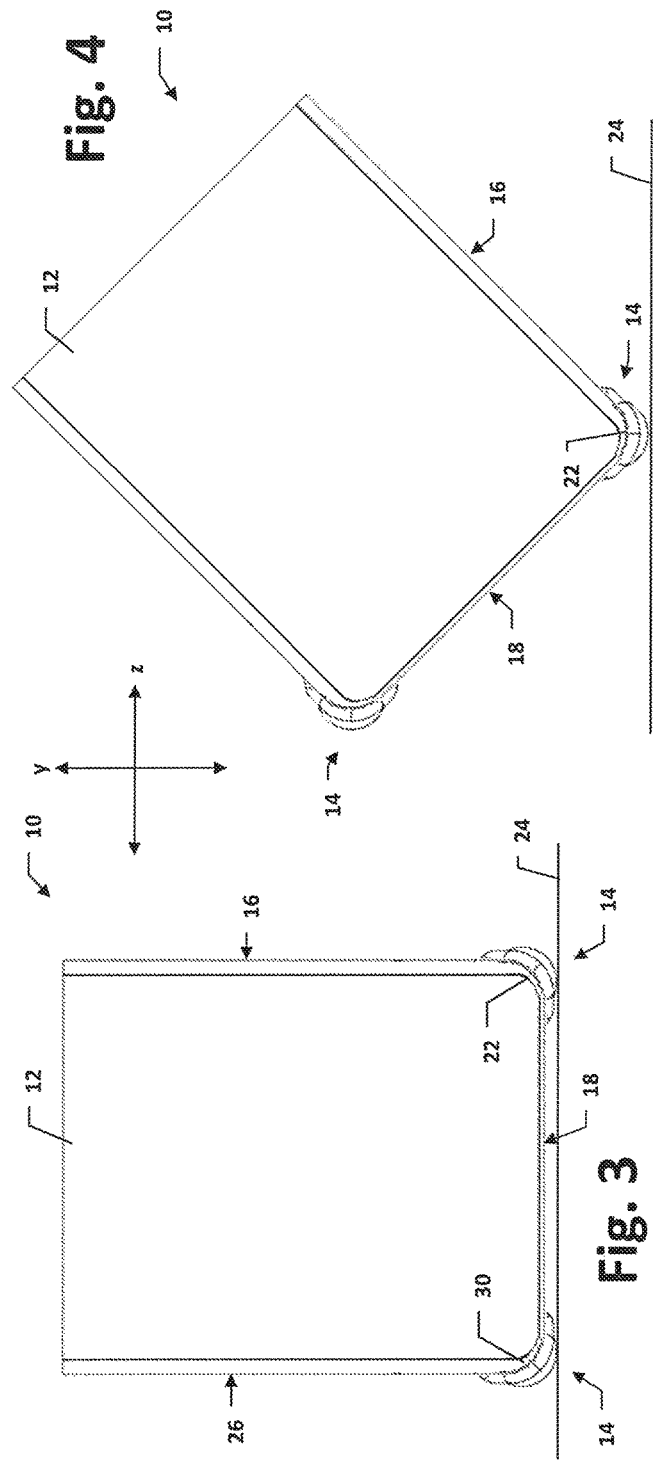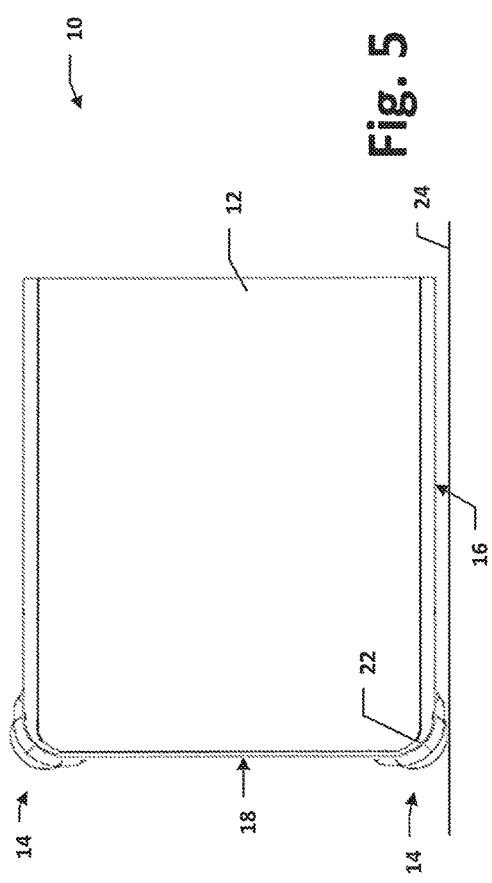

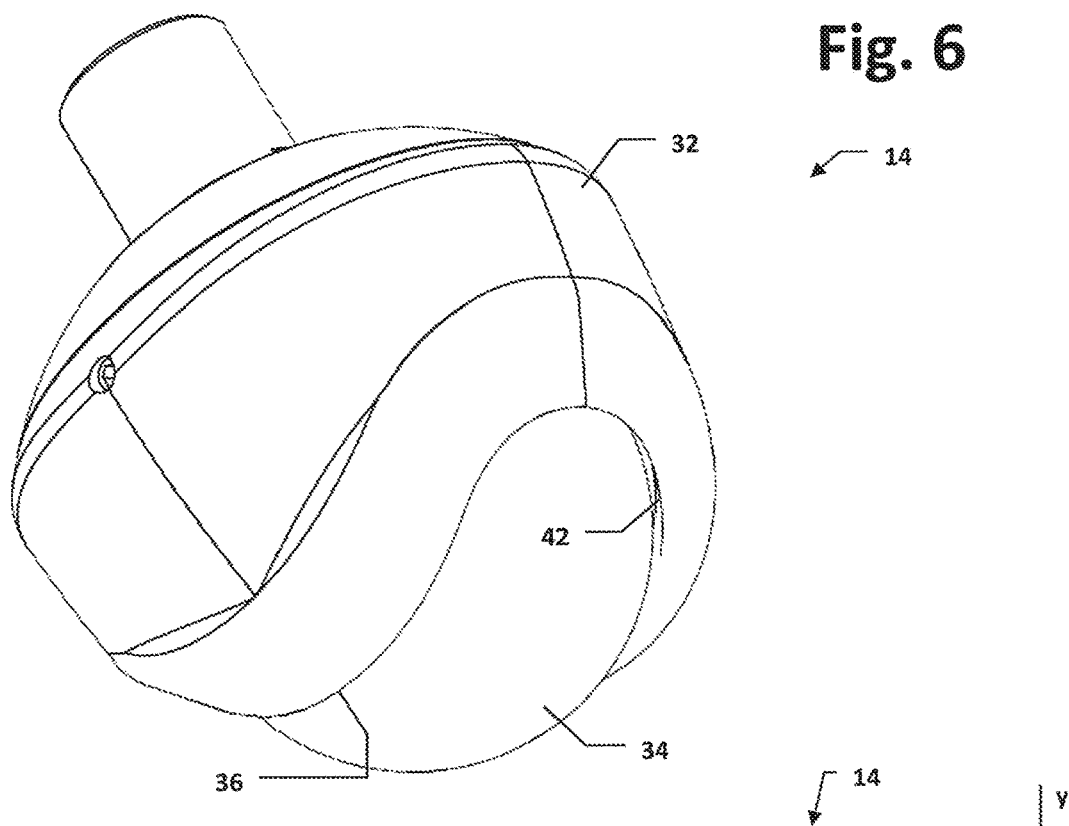
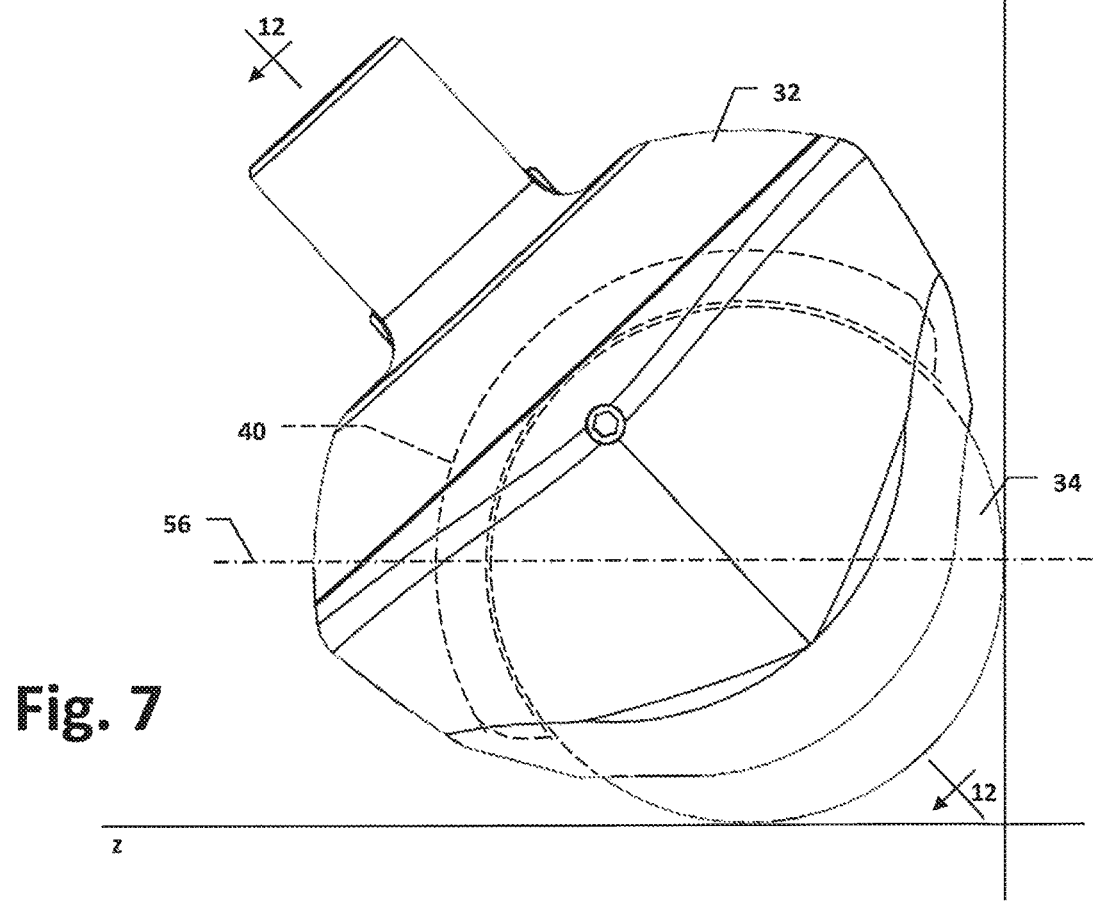

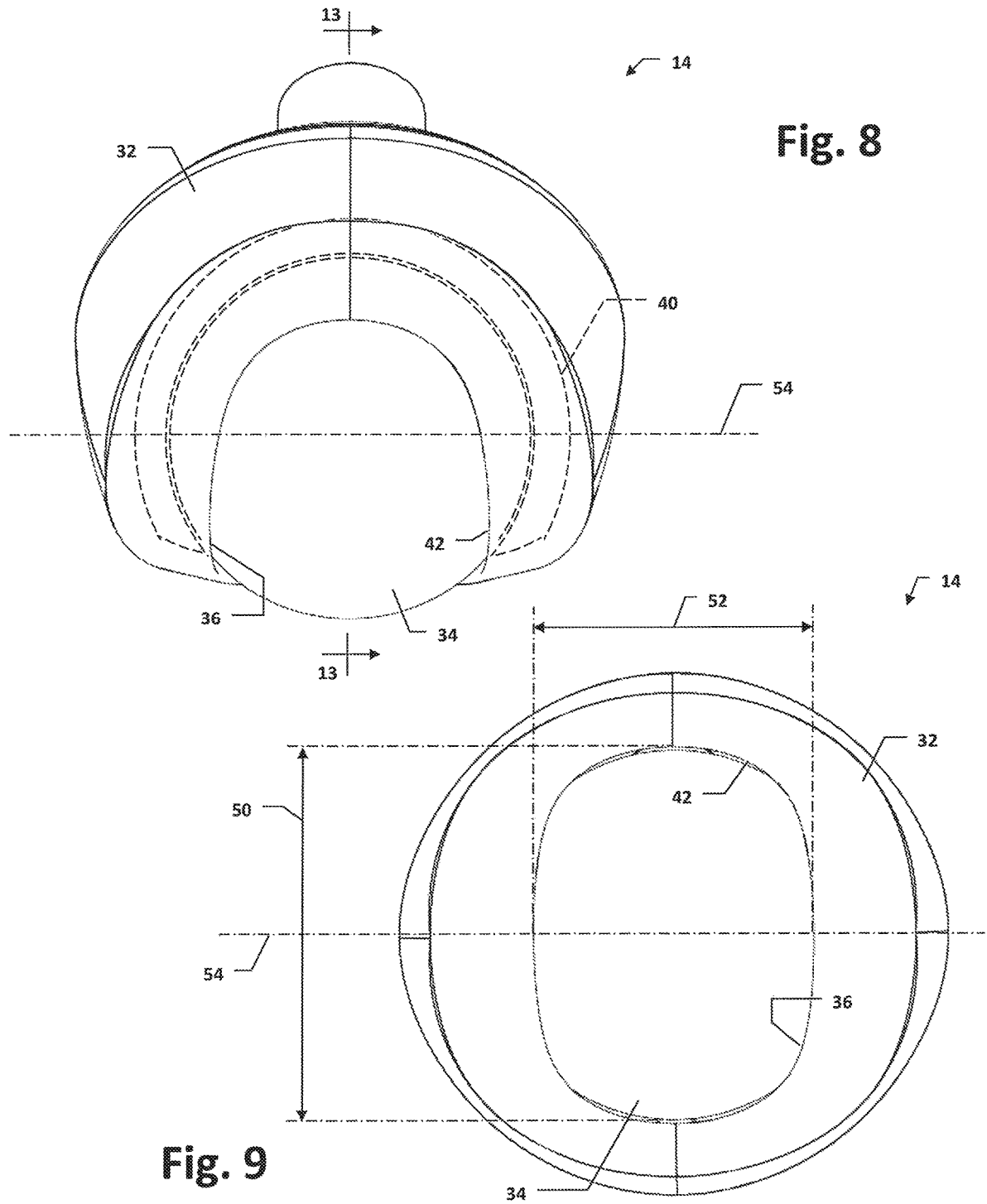

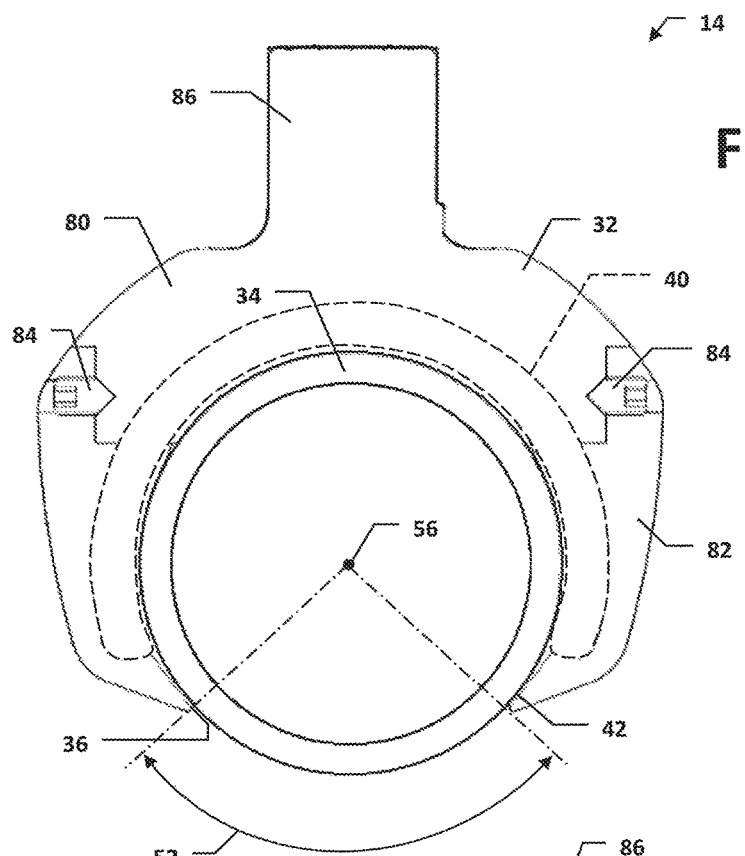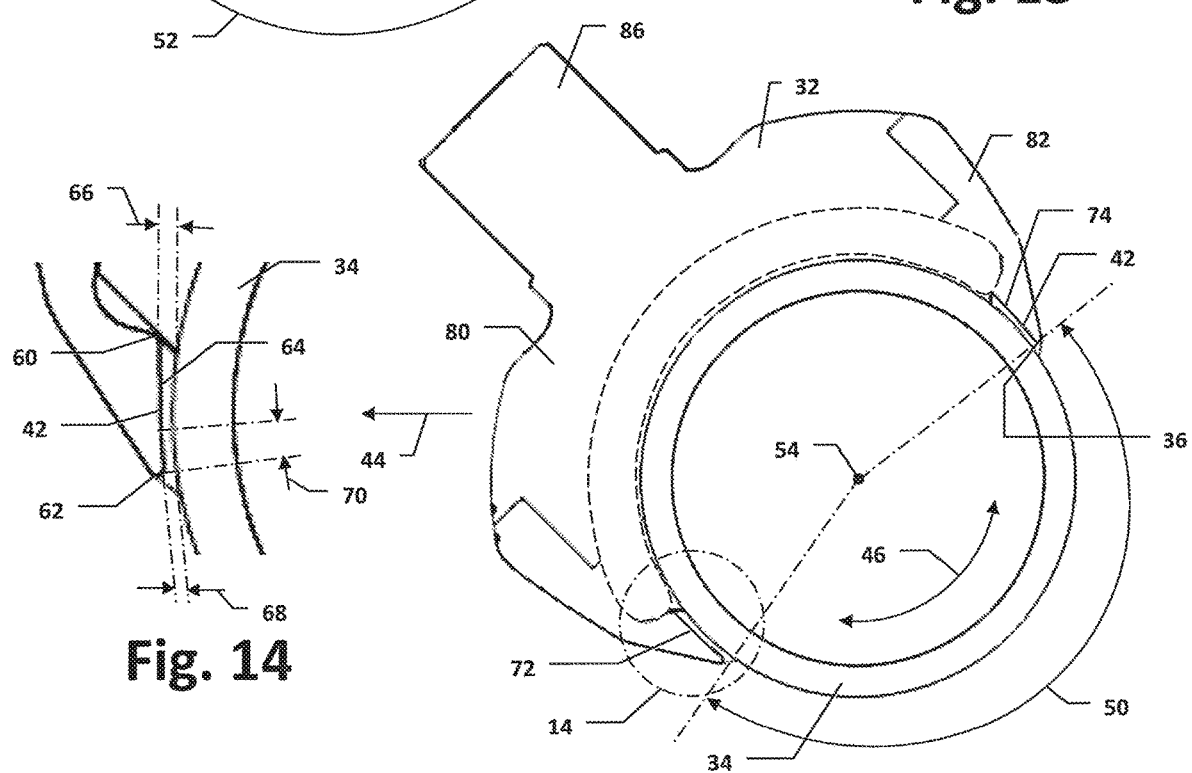

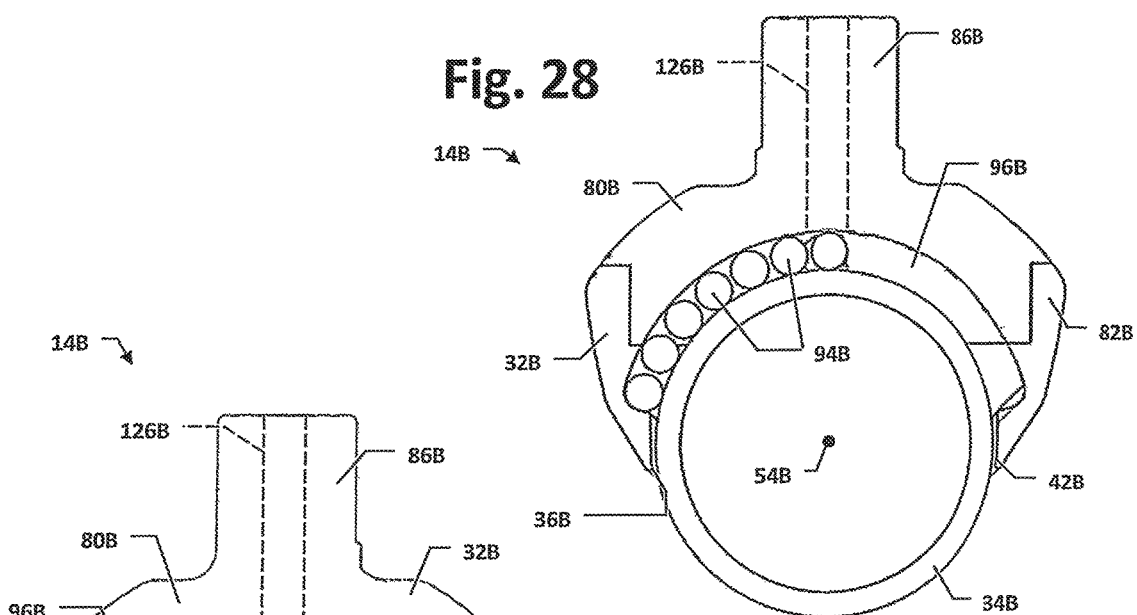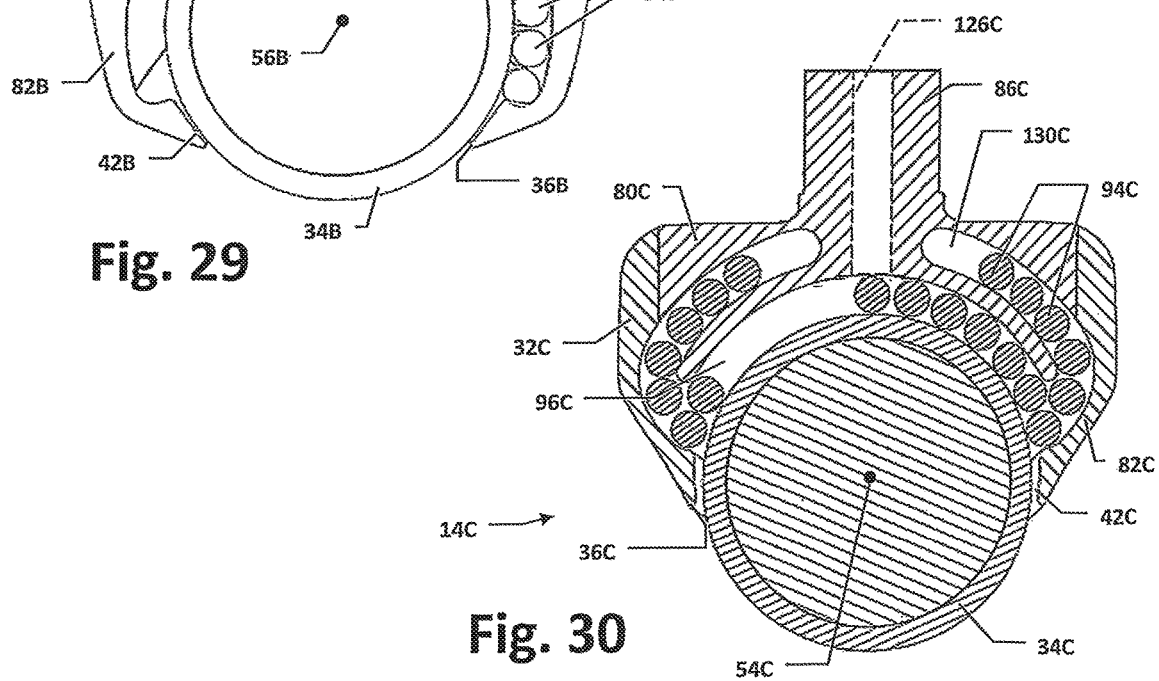

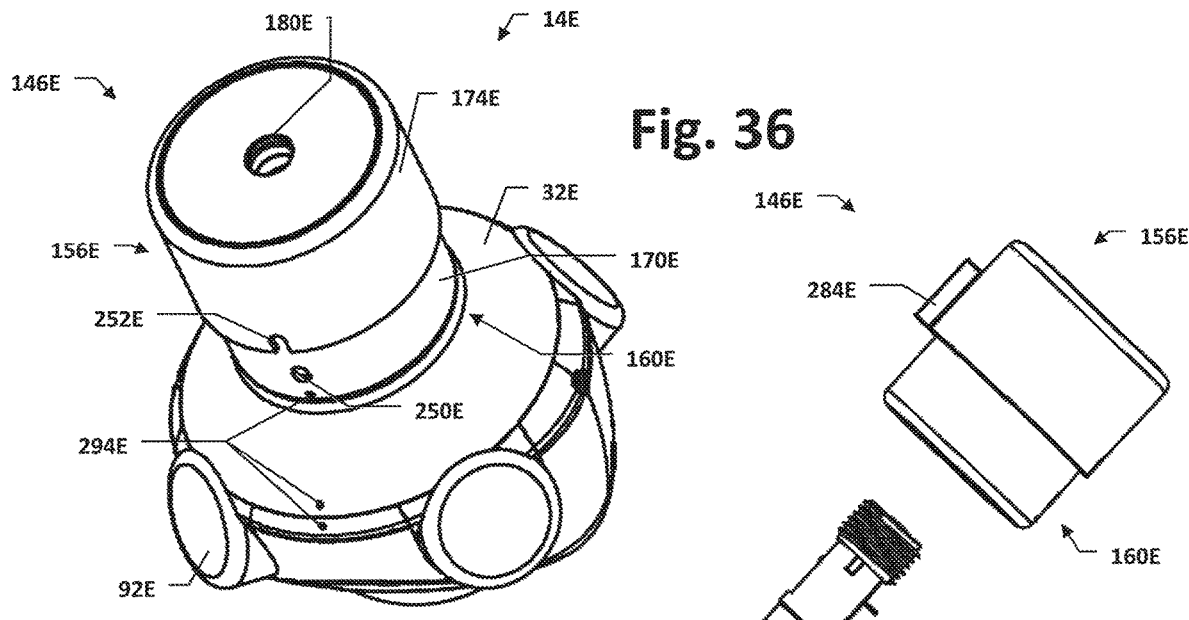
Fig. 36
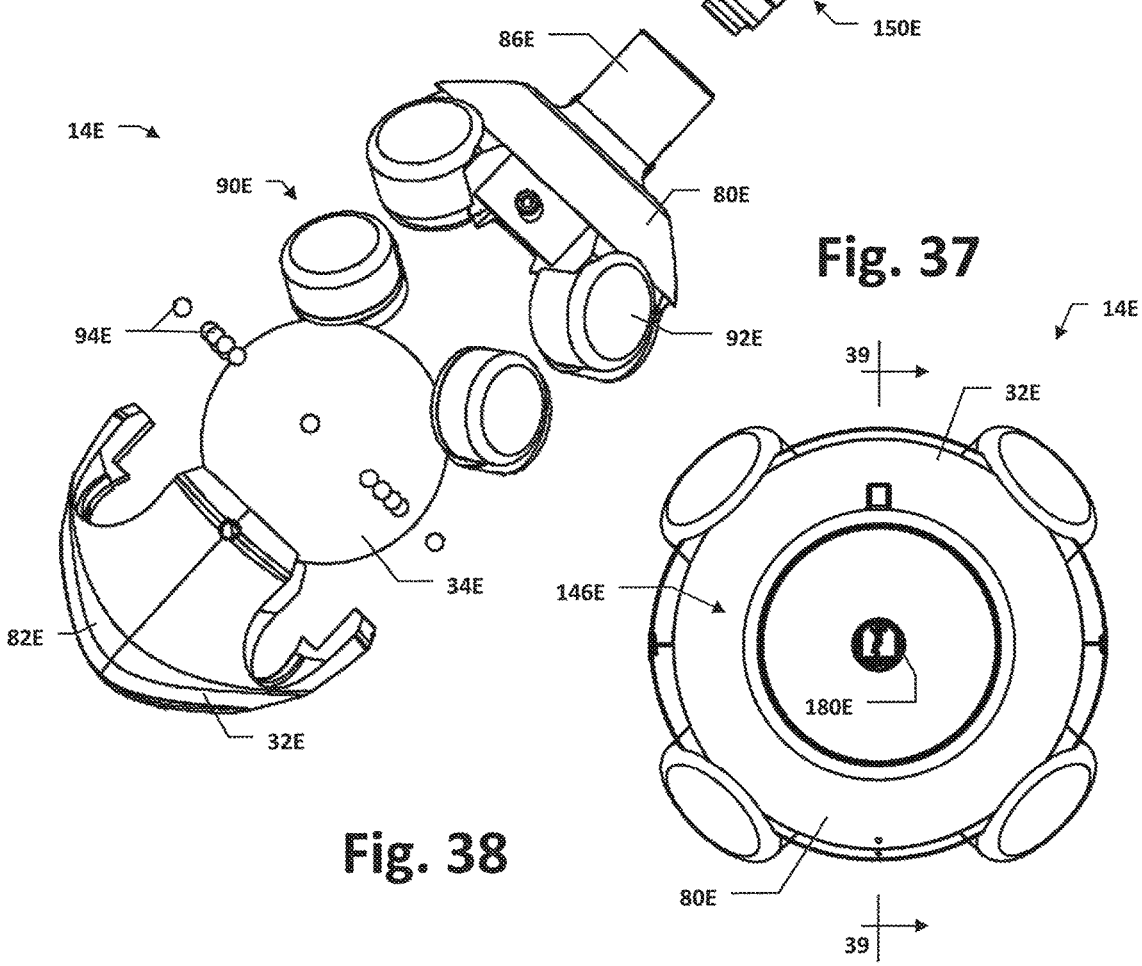
Fig. 37
Fig. 38

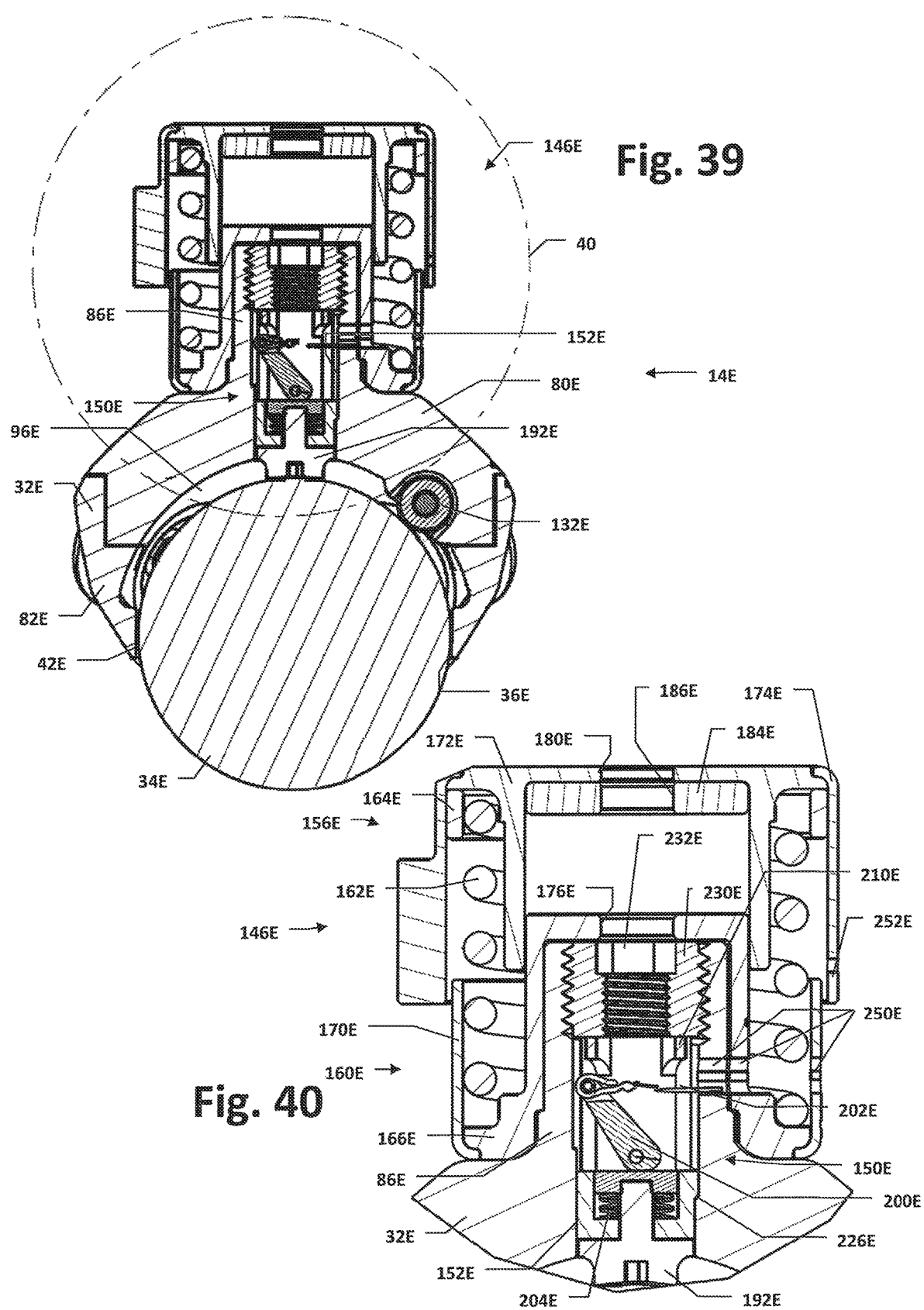

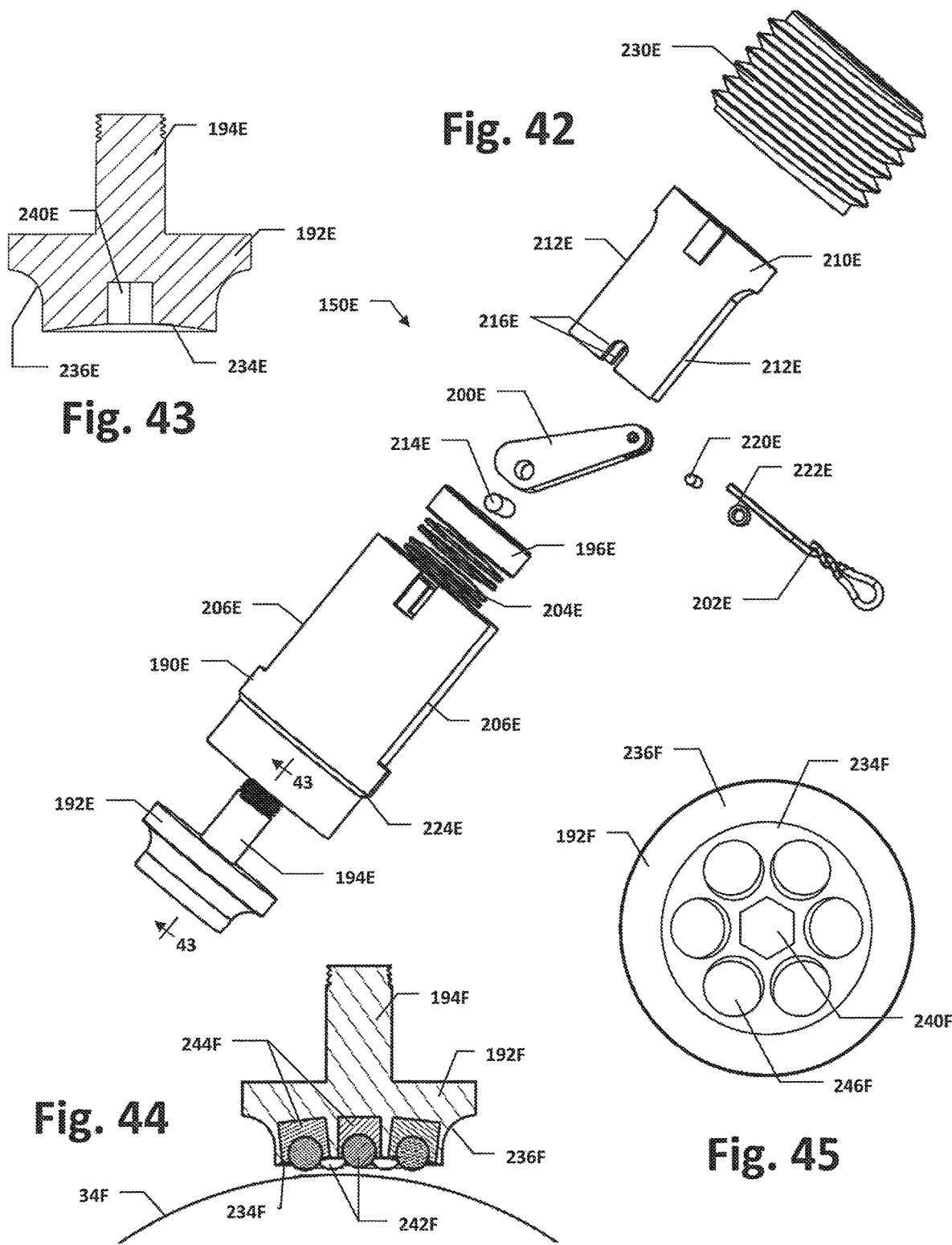

ARTICLE MOVEMENT SYSTEMS, BALL WHEELS AND RELATED APPARATUS AND METHODS

FIELD OF THE INVENTION

The present invention relates to providing support for rolling motion to articles, and more particularly, to apparatus and methods for providing omni-directional rolling support.

BACKGROUND OF THE INVENTION

Various types of wheels are employed to provide rolling support for articles like luggage cases, crates, dollies, etc. Where omni-directional rolling support is desired, casters are often employed. Additionally, omni-directional wheels exist that, unlike casters, allow rolling motion in multiple directions without requiring realignment of the wheel. The ball transfer unit, in which a ball is supported by a plurality of ball bearings so as to be able to freely rotate in any direction, is one type of omni-directional wheel. While, ball transfer units are more commonly employed in an inverted, ball-up, orientation, so as to allow objects to slide over them (e.g., in an assembly line), they are sometimes employed ball down for use as load-supporting wheels. While such wheels, casters and ball transfer units have proved useful, further improvements are possible.

SUMMARY OF THE INVENTION

In view of the foregoing, it is an object of the present invention to provide an article movement system, along with related ball wheels and other apparatus and methods. According to an embodiment of the present invention, an article movement system includes an article and at least one ball wheel. The article has first and second article surfaces meeting at a first article edge. The ball wheel is located along the first article edge and includes a ball, a bearing arrangement and a shell. The ball engages a surface underlying the article, the bearing arrangement supports the ball for omni-directional rotational movement, and the shell is located along the first article edge and contains the ball and the bearing arrangement. The shell defines a non-circular ball opening through which a portion of the ball extends to contact the underlying surface. The article, the bearing arrangement and the shell are configured such that the ball wheel is able to support the article for omni-directional rolling motion over the underlying surface with either of the first and second article surfaces parallel thereto, and at any orientation therebetween.

According to an aspect of the present invention, the non-circular ball opening has a major angular extent and a minor angular extent, the major angular extent being greater than the minor angular extent. According to another aspect of the present invention, a peripheral lip extends toward the ball around the non-circular ball opening.

According to a further aspect of the present invention, the bearing arrangement includes a plurality of micro-casters engaging the ball from within the shell. According to an additional aspect of the present invention, the bearing arrangement includes a plurality of ball bearings arranged in a bearing volume between the ball and the shell inside of the non-circular ball openings, the plurality of ball bearings being free to circulate therethrough.

According to another aspect of the present invention, the first ball wheel further includes a tracker wheel rotatably mounted in the shell such that, with the article in the vertical orientation, the tracker wheel is located horizontally adjacent to the ball and does not constrain omni-directional rotational movement thereof, and with the article in the inclined orientation, tracker wheel is located vertically above a portion of the ball and engagement of the ball with the tracker wheel results in enhanced rotational tracking of the ball in a direction perpendicular to a rotational axis of the tracker wheel.

According to a further aspect of the present invention, the first ball wheel further includes a suspension unit arranged around the neck and configured to absorb shocks experienced by the ball as it passes over the underlying surface. According to an additional aspect of the present invention, the first ball wheel further includes a brake unit arranged in an internal passage of the neck and operable to exert a braking force on the ball.

These and other objects, aspects and advantages of the present invention will be better appreciated in view of the drawings, and following detailed description of preferred embodiments.

BRIEF DESCRIPTION OF THE DRAWINGS

FIG. 3 is an side view of the article of FIG. 1, in vertical orientation;

FIG. 4 is a side view of the article of FIG. 1, in an inclined orientation;

FIG. 5 is a side view of the article of FIG. 1, in a horizontal orientation;

FIG. 6 is a perspective view of a representative one of the ball wheels of FIG. 1;

FIG. 7 is a side view of the ball wheel of FIG. 6;

FIG. 8 is a front view of the ball wheel of FIG. 6;

FIG. 9 is a bottom view of the ball wheel of FIG. 6;

FIG. 12 is a sectional view taken along line 12-12 of FIG. 7;

FIG. 13 is a sectional view taken along line 13-13 of FIG. 8;

FIG. 14 is a detail view of area 14 of FIG. 13;

FIG. 28 is a sectional view of an additional embodiment of a ball wheel, taken along a line similar to that of FIG. 13;

FIG. 29 is a sectional view of the ball wheel of FIG. 28, taken along a line similar to that of FIG. 12;

FIG. 30 is a sectional view of another embodiment of a ball wheel, taken along a line similar to that of FIG. 13;

FIG. 36 is a perspective view of an additional embodiment of a ball wheel, including a suspension unit and a brake unit;

FIG. 37 is a partially exploded perspective view of the ball wheel of FIG. 36;

FIG. 38 is a top view of the ball wheel of FIG. 36;

FIG. 39 is a sectional view taken along line 39-39 of FIG. 37;

FIG. 40 is a detail view of area 40 of FIG. 39;

FIG. 42 is an exploded view of the brake unit of the ball wheel of FIG. 36;

FIG. 43 is a sectional view, taken along line 43-43 of FIG. 42, of a brake shoe and rod of the brake unit;

FIG. 44 is a sectional view of an alternate embodiment of the brake shoe and rod of FIG. 43, shown in position over a ball;

FIG. 45 is a bottom view of the brake shoe of FIG. 44;

DETAILED DESCRIPTION OF PREFERRED EMBODIMENTS

Figure 1:
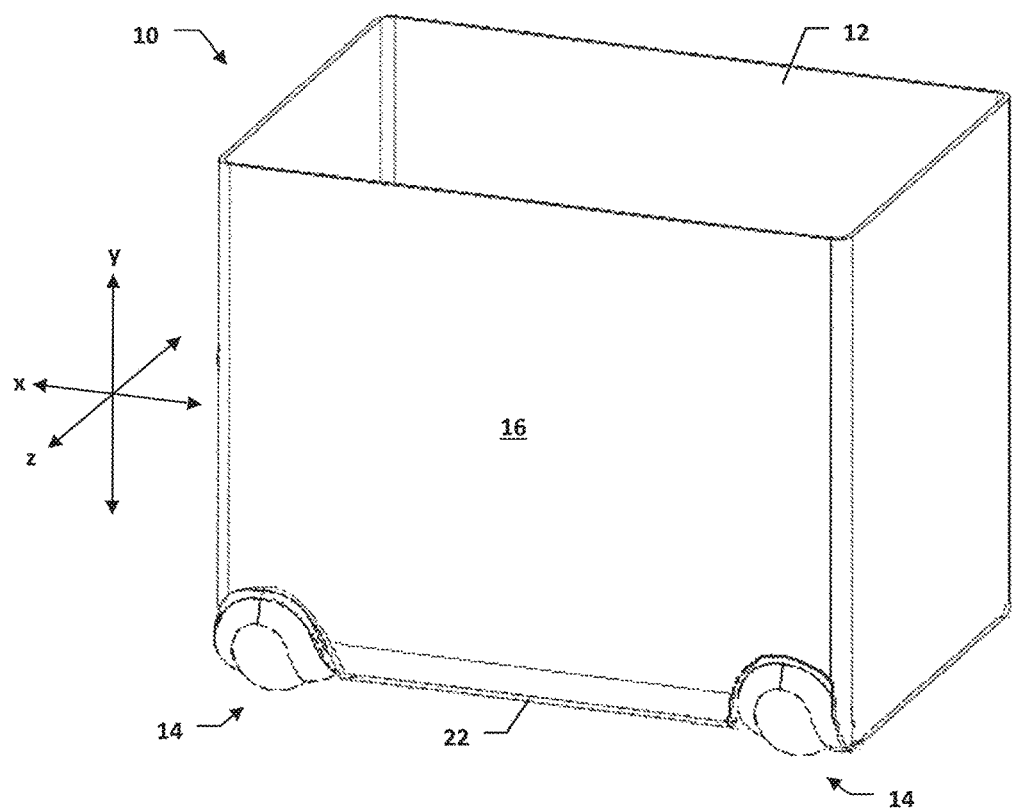
FIG. 1 is a perspective view of an article movement system including an article supported for omni-directional rolling motion by a plurality of ball wheels.
Figure 2:
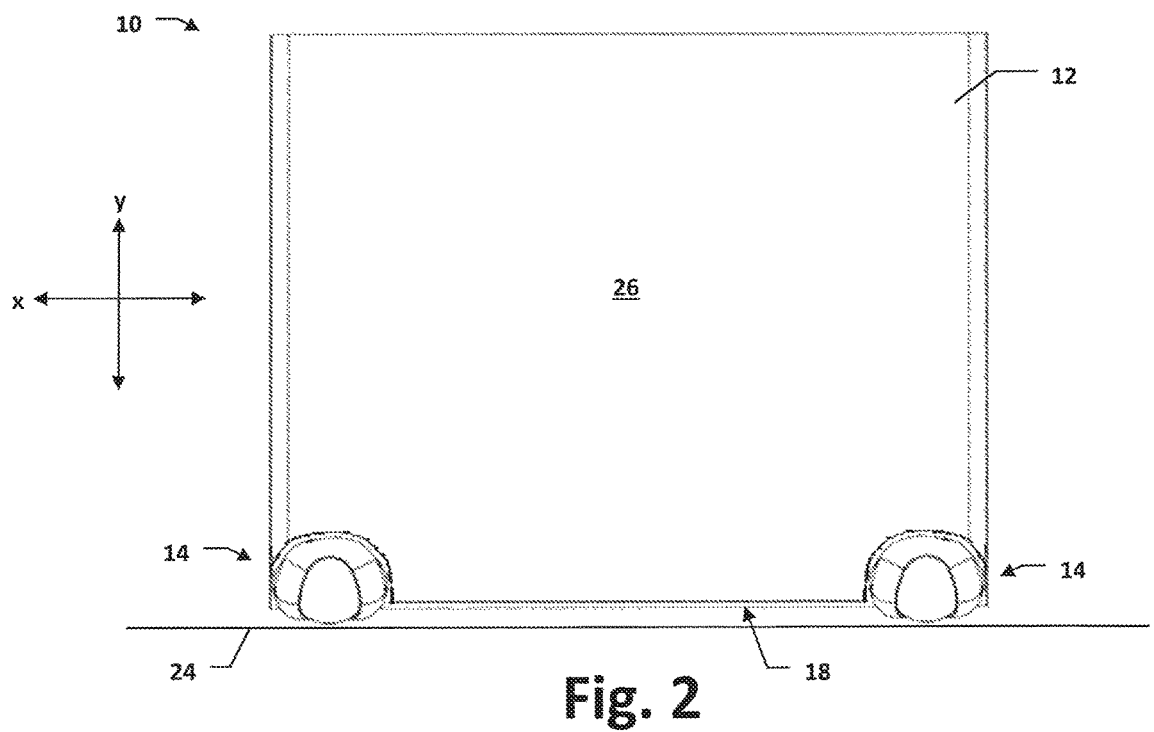
FIG. 2 is a rear view of the article of FIG. 1.

Referring to FIGS. 1-3, according to an embodiment of the present invention, an article movement system 10 includes an article 12 and one or more ball wheels 14. The article 12 includes first and second article surfaces 16, 18 meeting at a first article edge 22. The one or more ball wheels 14 are located at least along the first article edge 22 such that the article 12 is supported for omni-directional rolling motion over an underlying surface 24 with either of the first and second surfaces 16, 18 oriented generally parallel therewith, and at any orientation therebetween.

In the depicted embodiment, the first and second article surfaces 16, 18 are generally perpendicular. The article 12 additionally includes a third article surface 26 generally opposite and parallel with the first article surface 16 and generally perpendicular with the second article surface 18. The second and third article surfaces 18, 26 meet at a second article edge 30. Advantageously, one or more ball wheels 14 are also located along the second article edge 30, supporting the article 12 for rolling motion between the second and third article surfaces 18, 26 in the same manner as the one or more ball wheels 14 along the first article edge 22. Preferably, the article 12 includes at least four ball wheels 14, with a ball wheel 14 located proximate each end of the first and second article edges 22, 30.

As used herein, the term "edge" refers generally to the zone along which adjacent surfaces of the article meet. An "edge" is not necessarily a "sharp" edge, such as a perpendicular junction between the surfaces. For instance, in the depicted embodiment, the first and second article edges 22 and 30 both traverse curves between their respective articles surfaces. The use of articles with curved edges along which ball wheels are mounted can be advantageous, as it allows the ball wheels to recessed further into the article.

For efficiency of illustration, the article 12 is depicted as generic, partially-enclosed volume; it should be appreciated that the article movement system 10 is not limited to this article, or to any particular type of article 12. Luggage cases, crates, carts, and dollies are some non-limiting examples of articles to which ball wheels 14 could be advantageously mounted along one or more edges thereof. Likewise, the article 12 could be completely or partially solid between surfaces thereof, define a permanently open or selectively closeable interior storage volume, or incorporate one or more open sides.

For the purposes of providing a common frame of reference, the underlying surface 24 defines an x-z plane, with the y-direction being perpendicular thereto. The x-direction extends parallel with, and z-direction perpendicular to the first article edge 22. Thus, in FIGS. 1-3 the first and second article surfaces 16, 18 lie in x-y and x-z planes, respectively. In FIG. 4, the article 12 has rotated about an x-axis (though not necessarily the x-axis along which the first article edge 22 extends) with neither of the first and second article surfaces 16, 18 lying in x-y or x-z planes. In FIG. 5, the article 12 is now oriented with the first and second articles surfaces 16, 18 in x-z and x-y planes, respectively. Naturally, the article movement system 10 is not restricted to movement in these orientations. Also for reference purposes, the article 12 orientation in FIGS. 1-3 will be called vertical, the article 12 orientation in FIG. 5 will called horizontal, and any intermediate orientation rotated about an x-axis between vertical and horizontal (including that of FIG. 4) will be called inclined.

Multiple embodiments of components of the invention will be described herein. Similar reference numerals will be used to label similar elements, with a terminal letter (e.g., 14, 14A, 14B . . . 14X) used for different embodiments. Except as specified herein, similarly labeled elements should be understood as functioning in essentially the same manner.

Referring also to FIGS. 6-9, each ball wheel 14 includes a shell 32 and ball 34. The shell 32 defines a ball opening 36 through which a portion of the ball 34 extends. A bearing arrangement 40 supports the ball 34 for motion relative to the shell 32. The bearing arrangement 40 is depicted generically in FIGS. 7 and 8; specific embodiments of bearing arrangements will be described in greater detail below.

The shell 32 is fixed to the article 12 and is advantageously completely detachable therefrom, such that each ball wheel 14 can be formed separately from the article 12 and later affixed thereto. Alternately, some or all of the shell 32 can be formed integrally with adjacent portions of the article 12. Parts also offering different functions, such as a brake and suspension mechanisms (described in greater detail below), can cooperatively form portions of the shell 32.

The overall shape of shell 32 can vary; for example, based on the physical configuration of the specific bearing arrangement 40 contained therein. However, the shell 32 is generally physically configured so as to retain the ball 34 and bearing arrangement 40 therein, while allowing enough the ball 34 to extend through the ball opening 36 to remain continuously in contact with the underlying surface 24 with the article 12 in vertical, horizontal and inclined orientations, and when transitioning therebetween.

Allowing this contact means, in part, that the shell 32, ball 34, ball opening 36 and bearing arrangement 40 should be dimensioned such that at least a 90 degree arc of the ball 34 about an x-axis will protrude past the respective article edge 22, 30. In other words, the ball 34 is able to contact two orthogonal planes simultaneously without interference from the shell 32 or the surfaces of the article 12 (in FIG. 7, those would be x-z and x-y planes). In the depicted embodiment, the respective article 12 surfaces adjacent the edges 22, 30 are substantially flat. Where the respective article 12 surfaces adjacent the edges on which ball wheels are to be utilized are not flat (e.g., a suitcase where one or more sides bows outwardly), the ball 34 should extend past the intersection of perpendicular planes tangent to outermost points of the adjacent article surfaces (which is also the case in the depicted embodiment, except that there is not a single outermost point due to the flatness of the surfaces 16, 18, 26).

Figure 10:
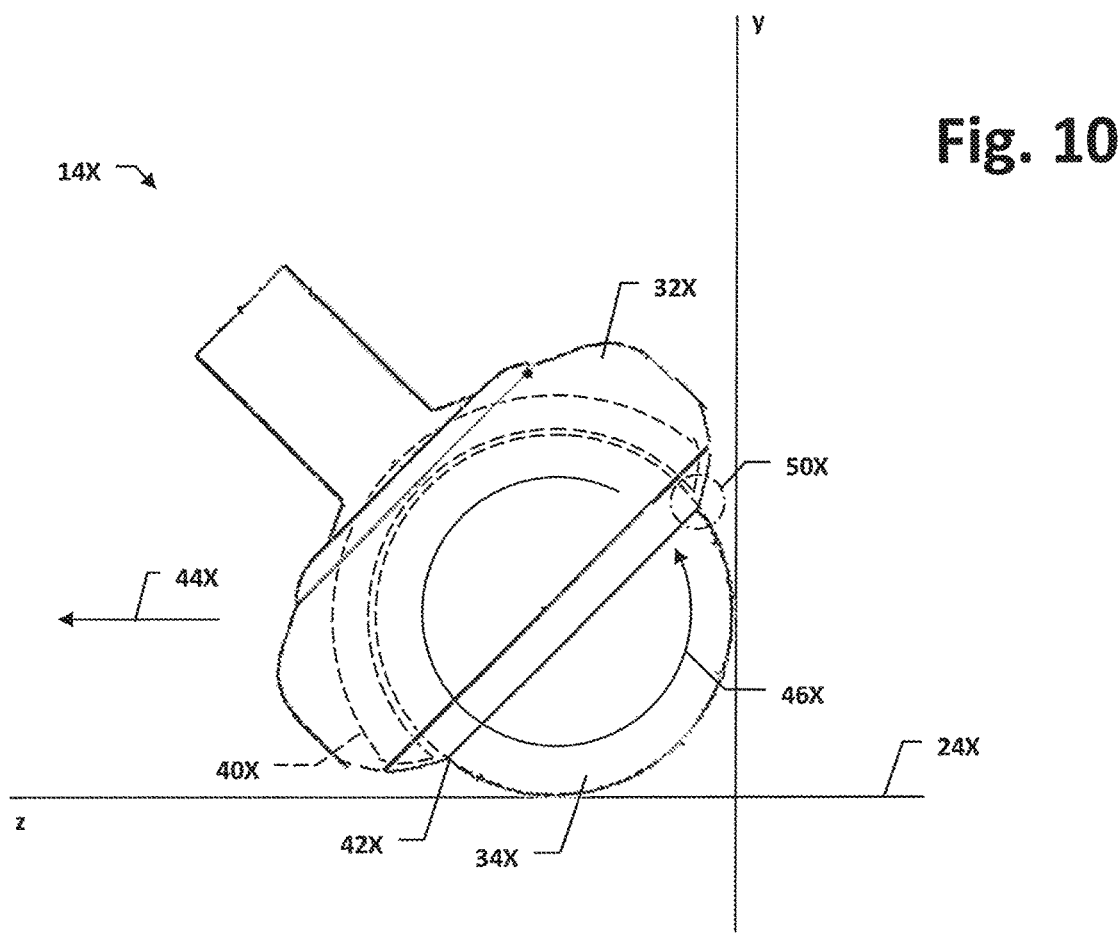
FIG. 10 is a side view of another embodiment of a ball wheel.
Figure 11:
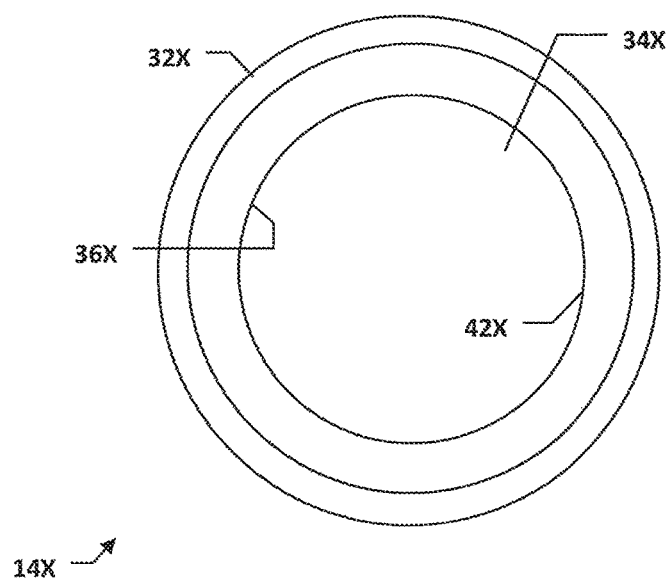
FIG. 11 is a bottom view of the ball wheel of FIG. 10.
Figure 15:
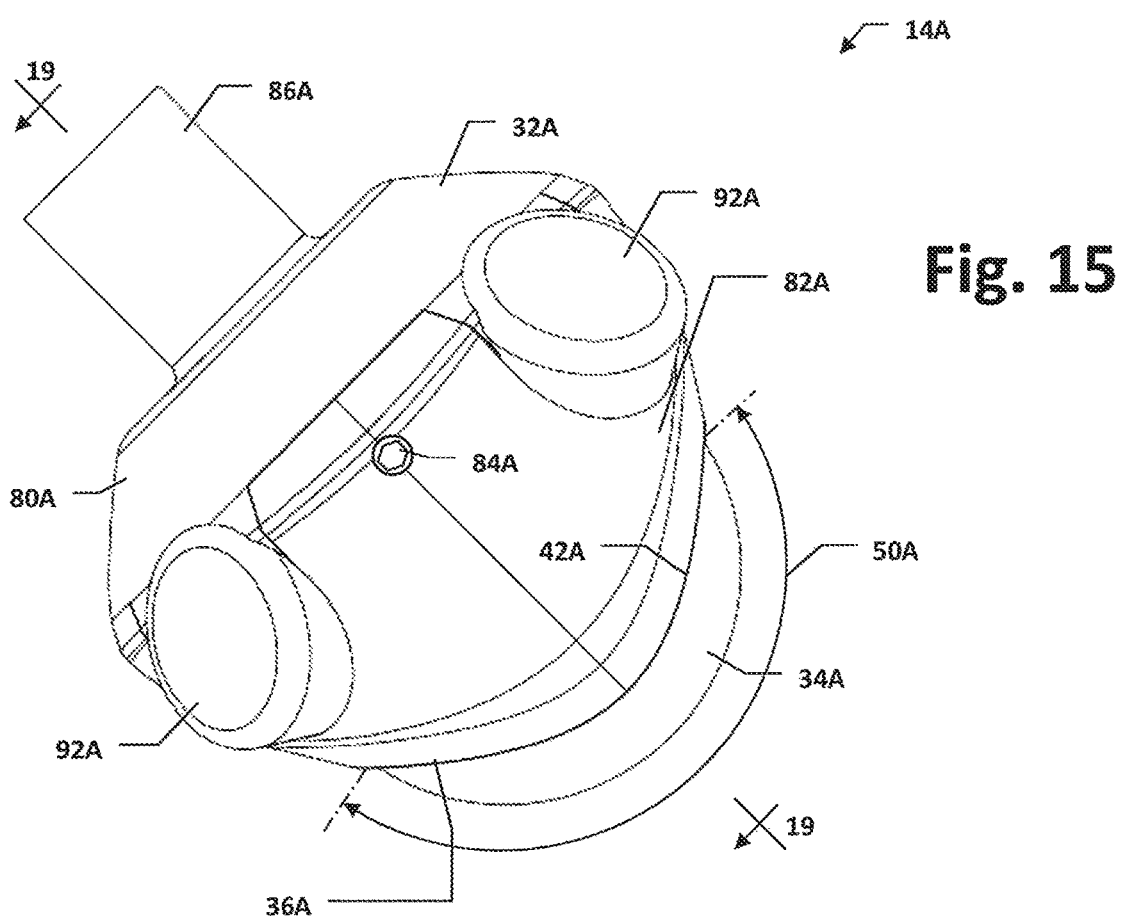
FIG. 15 is a side view of a further embodiment of a ball wheel, including a plurality of micro-casters.

Theoretically, referring to FIGS. 10 and 11, a circular ball opening 36X could permit necessary arc of ball 34X to protrude therethrough without interference. However, the circular ball opening 36X presents a number of practical shortcomings. If too close to an equator of the ball 34X, the ball 34X risks simply falling out of the shell 32X anytime the ball wheel 14X is moved out of contact with the underlying surface 24X. Additionally, the dynamic forces acting on the ball 34X when an associated article is being pulled over the underlying surface 24X may similarly urge the ball 34X out the shell 32X, as could the force exerted on the ball 34X by a brake mechanism or the like.

Another practical problem is that engagement between the ball 34X and a peripheral lip 42X of the ball opening 36X will inhibit rotational motion, particularly rapid rotational motion. The geometry of the shell 32X must allow space for a bearing arrangement 40X to function to support the ball 34X proximate to the lip 42X. If the shell 32X is made large enough to do this around the circular opening 36X, it would likely extend into the planes of contact with the ball 34X in the horizontal and vertical orientations of the respective article.

By way of illustration, if an article attached to the ball wheel 14X is (in the depicted orientation) being pulled in the direction represented by arrow 44X, the ball 34X needs to rotate as indicated by arrow 46X. Since the ball 34X is not pinned in place by an axle, the ball 34X will tend to be urged against the lip 42X in area 50X—where the highest surface velocities on the ball 34X will be encountered. Any bearing arrangement must be able to engage the ball 34X sufficiently well proximate the area 50X to prevent contact with the lip 42X.

Consequently, referring back to FIGS. 6-9, a non-circular ball opening 36 is preferred. The ball opening 36 does not lie in a single plane, but rather constitutes a three-dimensional curved opening having major and minor angular extents 50, 52. The major angular extent 50 is sufficient to allow the ball 34 contact two orthogonal planes simultaneously without interference from the shell 32—which, with the ball wheel 14 mounted on an edge of the article 12 (e.g., the first edge 22) allows the ball 34 to remain in contact with the underlying surface 24 in vertical, horizontal and inclined orientations of the article 12. In other words, the major angular extent 50 of the ball opening 36 must allow at least a 90 degree arc of the ball 34 to extend past the shell 32 around the first edge 22 (or second edge 30) without interference.

Using the reference frame previously established, the article edges 22, 30 extend along x-axes. Referring also to FIGS. 12 and 13, the major angular extent 50 of the ball opening 36 will form an arc (although not necessarily a circular arc) extending partially around a x-axis 54 of the ball 34 parallel with the edges 22, 30. The minor angular extent 52 of the ball opening 36 will form a shorter arc (again, not necessarily a circular arc) extending partially around a z-axis 56 of the ball 34. The major angular extent 50 is preferably greater than approximately 90 degrees about the x-axis 54, and more preferably between approximately 120 degrees to approximately 200 degrees. The minor angular extent 52 is preferably less than approximately 160 degrees about the z-axis 56, and more preferably between approximately 60 degrees to approximately 135 degrees. This non-circular ball opening 36 advantageously enhances ball 34 retention with the minor angular extent 52 ensuring that the ball 34 cannot be urged out of the shell 32, while major angular extent 50 permits the necessary degree of ball 34 contact to offer rolling support to an article 12 in vertical, horizontal and inclined orientations.

A peripheral lip 42 forms the perimeter of the ball opening 36, advantageously extending contiguously therearound. The geometry of the lip 42 is best appreciated in the sectional views of FIGS. 12 and 13 and the detail view of FIG. 14. In the depicted embodiment, the lip 42 tapers from a curved shoulder 60 forming its inner edge to a point 62 forming its outer edge, with "inner" and "outer" being used with reference to the edge of the lip 42 where the inside of the shell 32, the ball 34 and the bearing arrangement 40 converge and the edge of the lip 42 where the outside of the shell 32 converges with the ball 34, respectively. Additionally, the inner face 64 of the peripheral lip is advantageously angled such that a spacing 66 between the ball 34 and the shoulder 60 is greater than a spacing 68 between the ball 34 and the point 62. An outer portion 70 of the inner face 64, inwardly of the point 62, also has the same radius of curvature as the ball 34.

The shoulder 60 configuration and spacing 66 are set such that any freely moving components of the bearing arrangement 40 (e.g., individual ball bearings) are retained between the ball 34 and the shell 32. Additionally, where the ball wheel 14 is equipped with a brake mechanism (as will be described below), the inner face 64 of the lip 42, and more particularly the outer portion 70 thereof, can provide an engagement surface to enhance braking force.

The overall geometry and configuration of the lip 42 also help prevent fouling of the bearing arrangement 40 with debris picked up by the ball 34 when the article 12 is pulled over the underlying surface 24. To illustrate this function, referring particularly to FIG. 13, when the article is pulled in direction 44, the ball 34 will rotate in direction 46. With reference to direction 44, the edge of the lip 42 to the left side of FIG. 13 is the leading edge 72 and the edge of the lip 42 to the right side of FIG. 13 is the trailing edge 74. The forces acting on the ball 34 will tend to urge it closer to the trailing edge 74 and further away from the leading edge 72 (primarily due to the taking up of tolerances and any compressibility of the ball 34). The resultant smaller gap between the ball 34 and the trailing edge 74 will facilitate the ability of the point 62 to act as a "wiper" at the trailing edge. While not actually contacting the ball 34 (as the bearing arrangement 40 precludes such contact), the point 62 at the trailing edge 74 will be better positioned to engage debris carried on the rotating ball 34 and remove the debris before it is introduced into the bearing arrangement 40. On the leading edge 72, the resultant larger gap, aided by the funnel effect of spacing 66 being larger than spacing 68, will help funnel any previously introduced debris out of the bearing arrangement 40. This same general effect would be reproduced in any direction of article 12 motion.

To further assist in preventing debris from entering the bearing arrangement 40, the lip 42 can be magnetized. Consequently, ferromagnetic and/or otherwised charged debris particles will be attracted to the lip 42 prior to entering. A magnetized lip 42 can also offer other benefits in connection with specific bearing arrangement 40 embodiments, as will be discussed in greater detail below.

Referring to FIGS. 12 and 13, the shell 32 is advantageously formed in multiple parts to facilitate manufacture and assembly of the ball wheel 14. For example, with reference to the FIG. 12 orientation, the shell 32 includes upper and lower shell sections 80, 82. Preferably the sections 80, 82 are secured together by releasable fasteners 84, such as screws or the like. The upper section 80 advantageously includes a neck 86 which facilitates attachment of the ball wheel 14 to the article 12. The peripheral lip 42 is formed in the lower section. The ball 34 and all or a portion of the bearing arrangement 40 can be placed in the lower section 82, with the upper section 80 then being connected to secure the ball and bearing arrangement 40 in place within the shell 32. In certain embodiments, the neck 86 can be configured to facilitate the installation of a remainder of the bearing arrangement 40, as well as various accessories (explained in greater detail below), once the sections 80, 82 are connected.

The bearing arrangement 40 can be made in a variety of configurations to achieve the operational objectives of the ball wheel 14 in connection with its rolling support of the article 12. In a particularly advantageous embodiment, referring to FIGS. 15-19, the bearing arrangement of a ball wheel 14A includes a plurality of micro-casters 90A engaging the ball 34A from within the shell 32A. The micro-casters 90A are closely fitted into caster seats 92A formed in the shell 32A. The micro-casters 90A are rotatable relative to their seats 92A to support the ball 34A for omnidirectional rolling motion in the vertical, horizontal, and inclined orientations of an attached article (e.g., the article 12).

For additional rolling support of the ball 34A, a plurality of ball bearings 94A can also be arranged between the ball 34A and the shell 32A, being free to circulate through a volume 96A therebetween, the radial width of the volume 96A between the ball 34A and the shell 32A being slightly greater than the diameter of the bearings 94A. As explained in greater detail below, the micro-casters 90A are preferably configured such that the ball bearings 94A are free to travel over most of the ball-facing surface of each micro-caster 90A.

The volume 96A is preferably a partial sphere, terminating at the lip 42A. The curvature of the spherical volume 96A preferably matches that of the ball 34A. Preferably, the micro-casters 90A are arranged to approximately center the ball 34A within the volume 96A under load (through vertical, horizontal and intermediate orientations of an article 12), while also maintaining a predetermined spacing from the lip 42A. As described above in connection with FIGS. 13 and 14, this spacing will vary during rolling motion, and the geometry of the lip 42A is preferably as described therein. The bearings 94A help ensure this spacing is maintained, even during very extreme motion. By employing a magnetized lip 42A and ferromagnetic bearings 94A, the presence of sufficient bearings 94A in the vicinity of the lip 42 can also be facilitated.

Figure 16:
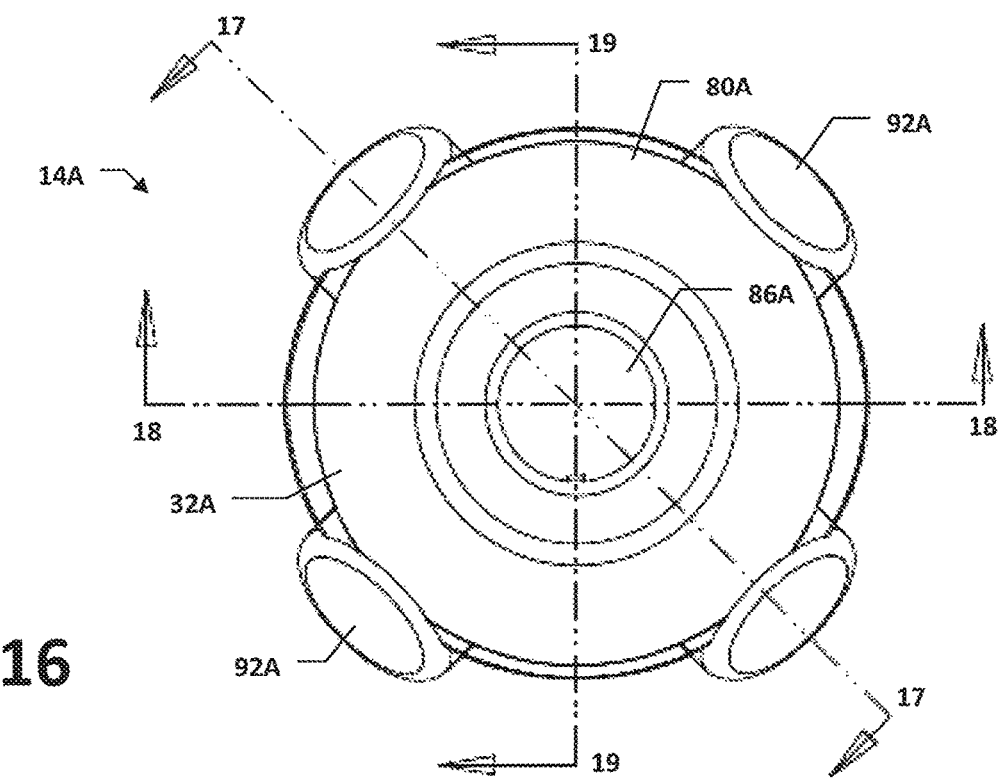
FIG. 16 is a top view of the ball wheel of FIG. 15.
Figure 17:
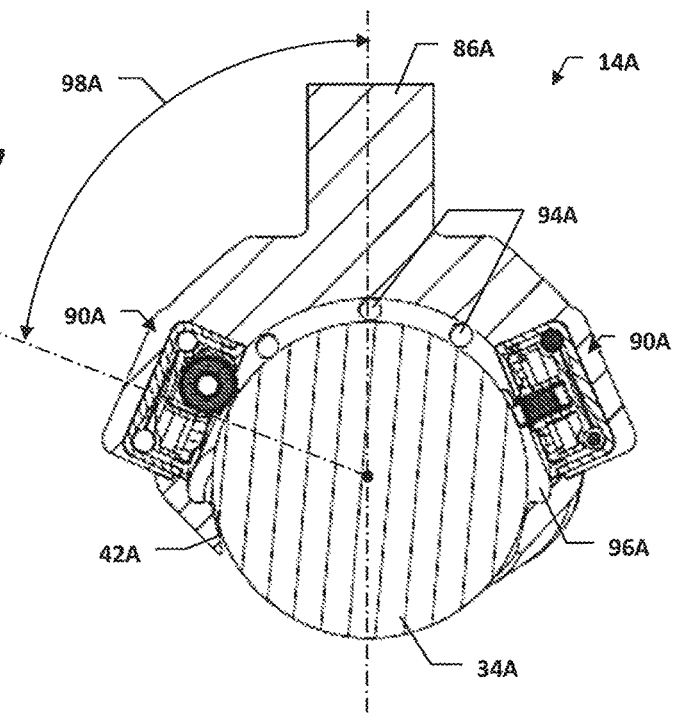
FIG. 17 is a sectional view taken along line 17-17 of FIG. 16.
Figure 18:
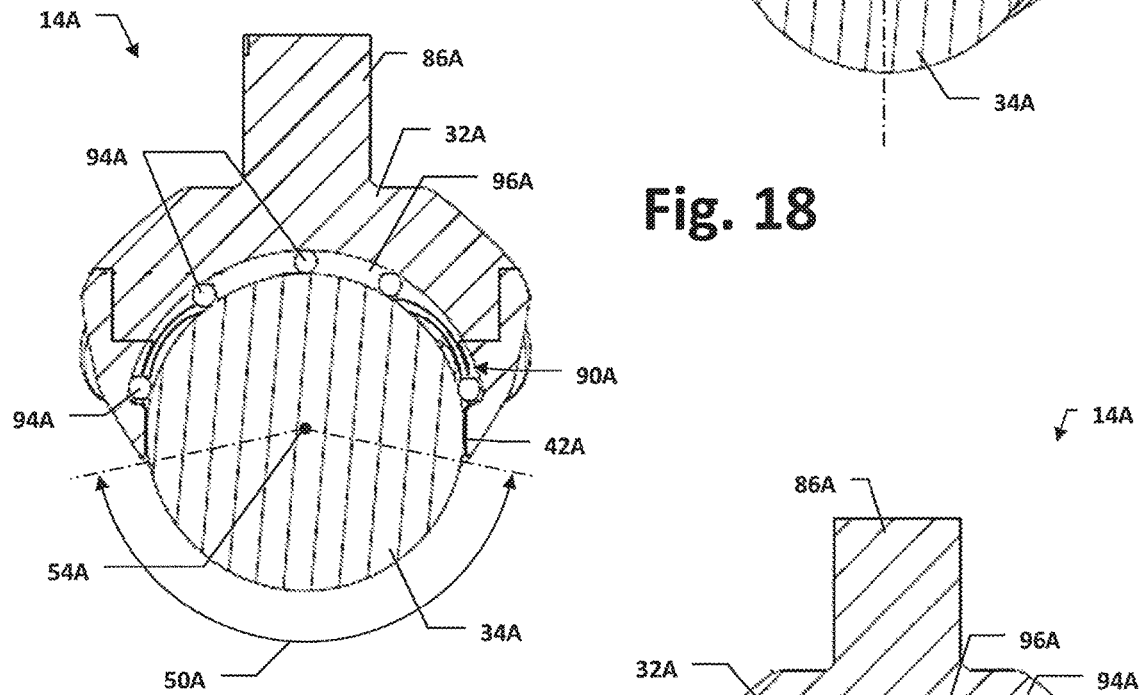
FIG. 18 is a sectional view taken along line 18-18 of FIG. 16.
Figure 19:
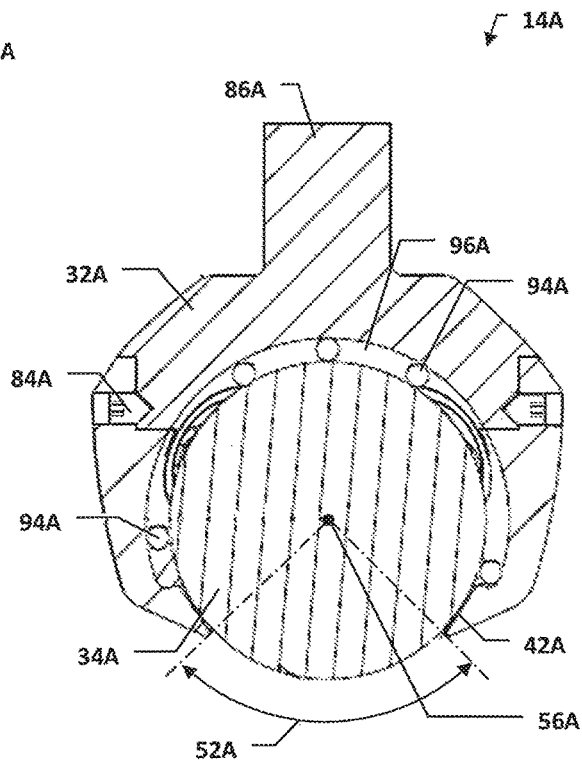
FIG. 19 is a sectional view taken along line 19-19 of FIG. 16.
Figure 20:
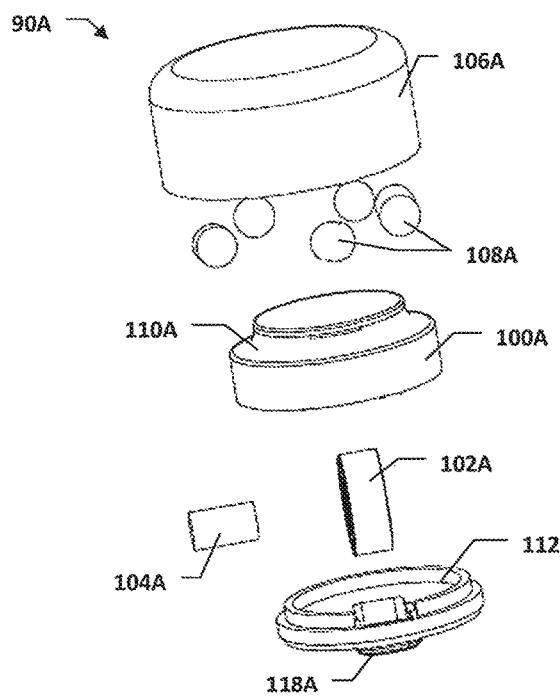
FIG. 20 is an exploded perspective view of a representative one of the micro-casters of the ball wheel of FIG. 15.
Figure 21:
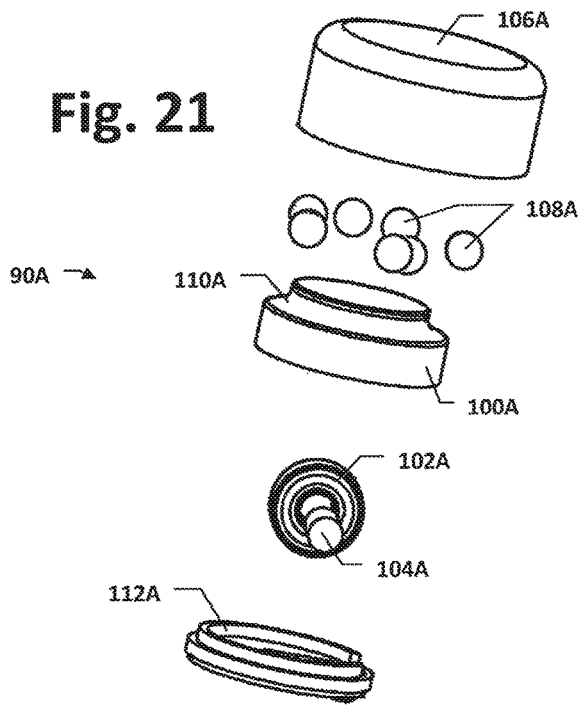
FIG. 21 is another exploded perspective view of the micro-caster of FIG. 20.

Preferably four micro-casters 90A are included, spaced symmetrically in quadrants around an upper section 80A of the shell 32A, as can best be seen in FIG. 16. Additionally, a central axis of each micro-caster 90A is offset by an angle 98A (see FIG. 17) of approximately 45-90 degrees from a central axis of the neck 86A, and most preferably between approximately 60-70 degrees. Advantageously, the micro-caster 90A locations do not coincide with the maximum and minimum angular extents 50A, 52A of the ball opening 36A. Instead, one micro-caster 90A is located in each quadrant between the y-z and y-x planes containing the maximum and minimum angular extents 50A, 52A.

Referring to FIGS. 20-24, each micro-caster 90A includes an inner housing 100A in which a caster wheel 102A is rotatably mounted about an axle 104A, and outer housing 106A. Advantageously, the caster wheel 102A can be formed as a sealed, deep groove bearing. The outer housing 106A is fixedly mounted into a respective caster seat 92A. The inner housing 100A is mounted within the outer housing 106A so as to be freely rotatable relative to the outer housing 106A and seat 92A. Advantageously, the inner housing 100A is rotatably supported relative to the outer housing 106A via a plurality of ball bearings 108A riding between tracks 110A, 111A formed in an upper surface (relative to the FIGS. 23 and 24 orientation) of the inner housing 100A and a lower surface of the outer housing 106A, respectively.

The axle 104A is mounted eccentrically within the inner housing 100A, such that the rotational axis of the inner housing 100A extends at a right angle to, but does not intersect, the rotational axis of the axle 104A. Thus, the rotational axis of the axle 104A is parallel with a plane tangent to the lower (relative to the FIGS. 23 and 24 orientation) peripheral edge of the micro-caster 90A, while the rotational axis of the inner housing 100A is perpendicular to such a plane.

As noted above, one micro-caster 90A is advantageously located in each quadrant formed between the maximum and minimum angular extents 50A, 52A (as best appreciated in FIG. 16) and at an angle 98A from a central axis of the neck 86A. Preferably, the location of the micro-casters 90A within the quadrants is selected such that, if the ball 34A were divided into leading and trailing hemispheres during rolling motion throughout the vertical, horizontal and inclined orientations of an article 12, two of the contact points between the ball 34A and caster wheels 102A will be in the leading hemisphere and two will be in the trailing hemisphere—except for an exceptional case. In the exceptional case, an article 12 is being pulled in a direction of motion that aligns two opposing ball wheels (e.g., if an article were being pulled in the direction of the sectional line 17-17 in FIG. 16). In this case, the aligned micro-casters 90A are centered and in the leading and trailing hemispheres, respectively, and the other two micro-casters 90A are essentially located along the division between the leading and trailing hemispheres. To achieve this, each of the micro-casters 90A is preferably within +/−30 degrees of the plane bisecting its quadrant (in FIG. 16, sectional line 17 lies in such a plane), and more preferably, within +/−5 degrees.

The phrase "positioned for dual engagement" is herein defined to refer to the positioning of micro-casters 90A as described in this paragraph.

Figure 23:
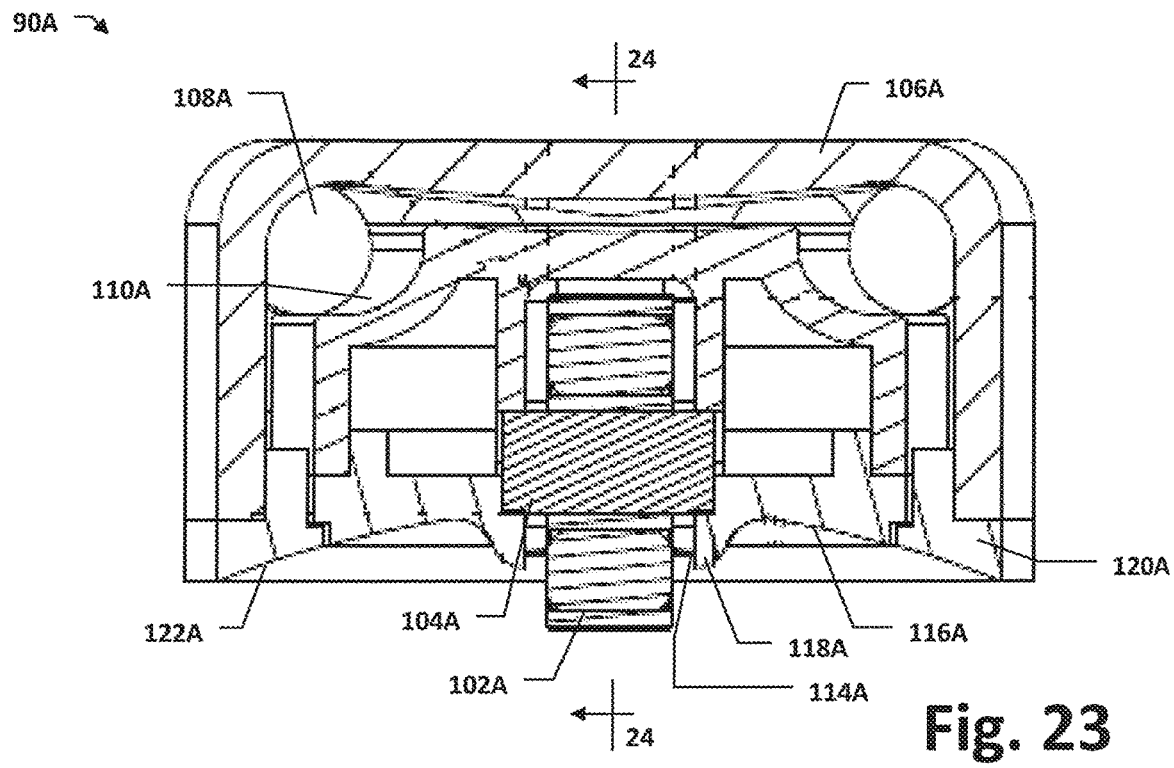
FIG. 23 is a sectional view taken along line 23-23 of FIG. 22.
Figure 24:
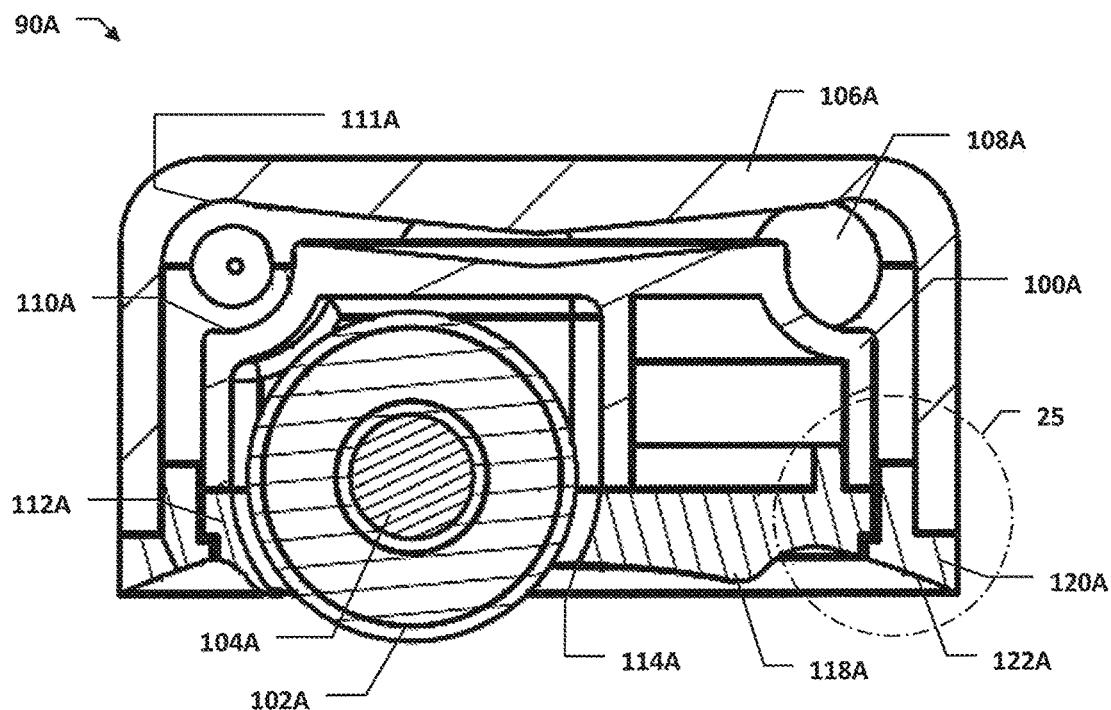
FIG. 24 is a sectional view taken along line 24-24 of FIG. 22.

It should be noted that the sectional view of FIG. 23 is taken along the line of the rotational axis of the axle 104A, and not through the center of the micro-caster 90A. FIG. 24 is a true cross-section, taken perpendicular to the FIG. 23 section along a line intersecting the rotational axis of the inner housing 100A. Preferably, the inner housing 100A is closed by a cap 112A. The cap 112A defines a caster wheel opening 114A through which enough of the caster wheel 102A extends to engage the ball 34A. The cap 112A is fixed to, and rotates with, the inner housing 100A. An outer surface 116A (i.e., facing away from the inner housing 100A) of the cap 112A is contoured to continue the curvature of the inner surface of the shell 32A (which partially defines the volume 96A), except for a central protrusion 118A extending around the caster wheel opening 114A. Thus, the cap 112A allows any free bearings 94A to travel smoothly across the micro-caster 90A, while the central protrusion 118A diverts any free bearings around the caster wheel 102A. The cap 112A also helps prevent the entrance of any debris into the inner housing 100A which might inhibit rotation of the caster wheel 102A about its axle 104A, as does the protrusion 118A—which is also effective to deflect and remove debris from the caster wheel 102A.

The central protrusion 118A can also help transfer impact loads from the caster wheel 102A to the shell 32A. The compressibility of the ball 34A by the caster wheel 102A can result in the ball 34A also coming into contact with the central protrusion 118A under impact loads above a certain threshold. That threshold can be varied by adjusting the amount of the wheel 102A that clears the central protrusion 118A.

Figure 25:
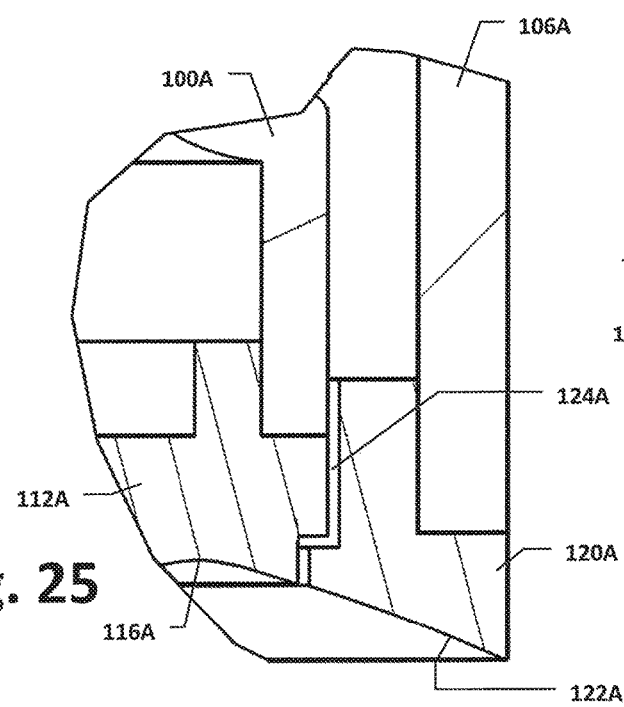
FIG. 25 is a detail view of area 25 of FIG. 24.
Figure 22:
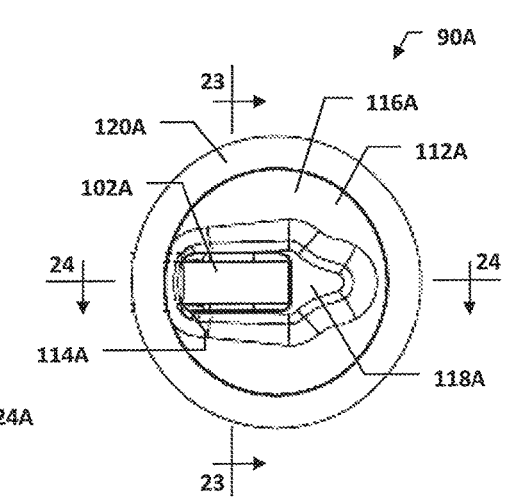
FIG. 22 is a bottom view of the micro-caster of FIG. 20.

The volume between the inner and outer housings 100A, 106A is preferably enclosed by a sealing ring 120A. The sealing ring 120A prevents the introduction of any debris between the inner and outer housings 100A, 106A, preventing fouling of the bearings 108A. Like the cap 112A with its contoured outer surface 116A, the sealing ring 120A advantageously has an outer surface 122A contoured to continue the curvature of the inner volume 96A of the shell 32A. Thus, around the central protrusion 118A, the entire outer surface of the micro-caster 90A is composed of the outer surfaces 116A, 122A and does not interrupt the preferably spherical curvature of the volume 96A. As best seen in FIG. 25, a narrow, step-shaped gap 124A separates the cap 112A and the sealing ring 120A, such that free rotation of the inner housing 100A and cap 112A is not inhibited by the sealing ring 120A.

Figure 26:
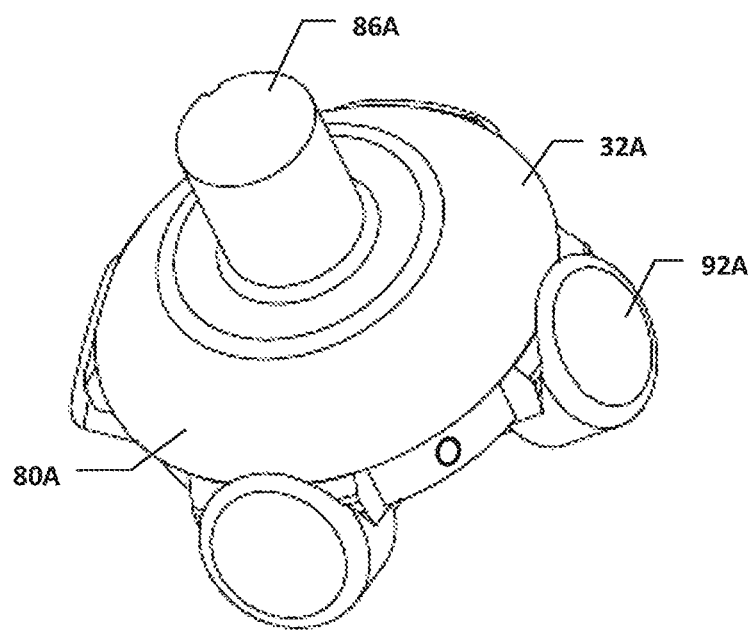
FIG. 26 is a perspective view of an upper section of a shell of the ball wheel of FIG. 15.
Figure 27:
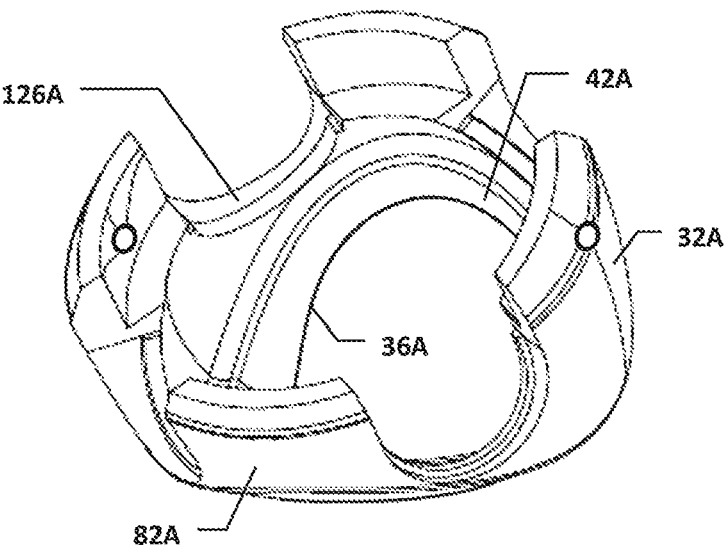
FIG. 27 is a perspective view of a lower section of the shell of the ball wheel of FIG. 15.

Referring to FIGS. 26 and 27, the shell 32A of the ball wheel 14A also is preferably formed with separate, connectable upper and lower sections 80A, 82A. The upper section 80A includes the neck 86A and the caster seats 92A. The ball opening 36A is defined in the lower section 82A surrounded by the peripheral lip 42A, as are notches 126A dimensioned to closely accommodate the caster seats 92A. This arrangement easily allows the micro-casters 90A to be mounted in their seats 92A, any bearings 94A to be introduced and the ball 34A to be put in place. The lower section 82A can then be attached (preferably by fasteners 84A—see FIG. 19), securing the entire bearing arrangement and the ball 34A in place.

In another embodiment, referring to FIGS. 28 and 29, a ball wheel 14B utilizes a bearing arrangement including a plurality of ball bearings 94B which freely circulate through a bearing volume 96B formed between the ball 34B and the shell 32B, the volume 96B preferably forming a partial sphere with the same curvature as the ball 34B. The circulating ball bearings 94B support the ball 34B for omni-directional rolling motion in the vertical, horizontal, and inclined orientations of an attached article (e.g., the article 12). Only a portion of the ball bearings 94B are shown for clarity of illustration; nonetheless, it is preferred that the number of ball bearings 94B not result in the volume 96B being tightly packed with ball bearings, as this could inhibit free circulation. At the same time, the number should be sufficient to ensure at least some ball bearings will be adequately positioned to offer support throughout the desired range of article orientations.

Advantageously, the geometry of the bearing volume 96B within the non-circular opening 36B results in the highest concentration of ball bearings 94B being proximate to the x-axis 54B about which the ball 34B rotates during rolling motion in the z-direction. Conversely, less ball bearings 94B will be contacting the ball 34B proximate the rotational "equator" (lying in the y-z plane dividing the ball 34B into hemispheres). Proximate the x-axis 54B, the surface velocities of the ball 34B will be lower, while surface velocities will be highest near the y-z equator. Therefore, the rotational drag is reduced, and the ball wheel 34B enjoys higher speed and load limitations.

As with the ball wheels 14, 14A, the shell 32B of the ball wheel is advantageously formed with upper and lower sections 80B, 82B, with the upper section 80B carrying the neck 86B and the lower section 82B defining the ball opening 36B with the peripheral lip 42B. As described above, the use of separate sections facilitates assembly of the ball wheel 14B. Due to the large number of ball bearings 94B it may also be desirable for a sealable passage 126B to be formed extending axially though the neck 86B to the bearing volume 96B. The diameter of the passage 126B should be sufficient to allow the ball bearings 94B to pass therethrough. It may not be practical to contain the desired number of ball bearings 94B between the upper and lower sections 80B, 82B during connection thereof. A final number of the ball bearings 94B could then be introduced through the passage 126B after the shell 32B was connected around the ball wheel 34B.

As noted above, in a ball wheel with a bearing arrangement like that of the ball wheel 14B, there is a preferred balance to be achieved between too many ball bearings, resulting in undesirable binding, and too few ball bearings, resulting in insufficient support. In a ball wheel 14C (see FIG. 30), the bearing arrangement again includes a plurality of ball bearings 94C freely circulating in a bearing volume 96C defined between the shell 32C and the ball 34C. However, peripheral edges of the bearing volume 96C communicate with a bearing well 130C defined in the shell 32C away from the ball 34C. Thus, filling the bearing volume 96C with ball bearings 94C does not present a potential binding problem, as excess bearings 94C can freely circulate into and out of the bearing well 130C as necessary.

As will be appreciated from the foregoing, the present invention offers multiple embodiments of bearing arrangements 40 for ball wheels 14 that will support the article 12 for omni-directional rolling motion in vertical, horizontal, and inclined orientations. However, when pulling an article 12 over a distance (which is most likely to occur in the inclined or horizontal orientations), is can be desirable to ensure that the article 12 will track in an essentially straight line. Some degree of beneficial tracking is already provided by the specific bearing arrangements described above in connection with the ball wheels 14A, 14B and 14C. For example, the alignment of the micro-casters 90A when pulling an article in the inclined orientation will tend to favor continued straight-line motion. Similarly, the circulation pattern established by the ball bearings 94B (or 94C) when pulling an article in the inclined orientation will tend to favor continued straight-line motion.

Figure 31:
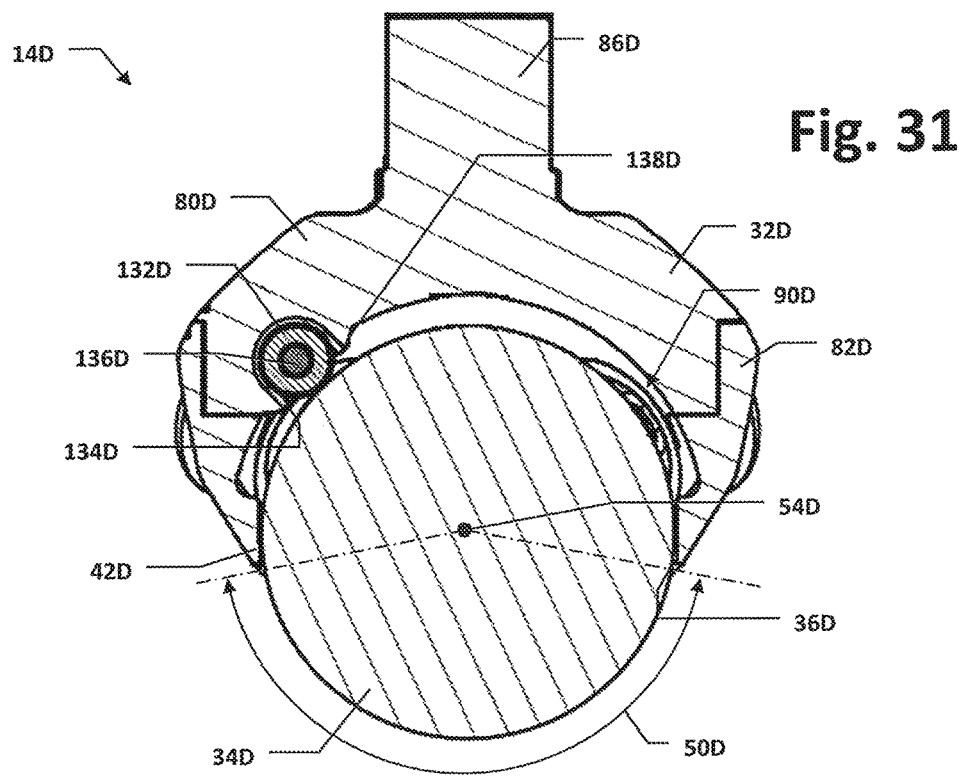
FIG. 31 is a sectional view of a further embodiment of a ball wheel, taken along a line similar to that of FIG. 18, including a tracker wheel.
Figure 33:
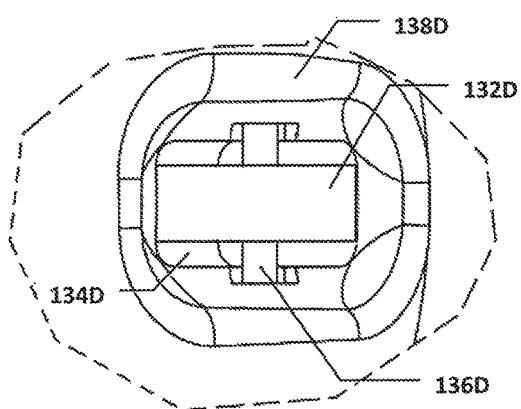
FIG. 33 is a detail view of area 33 of FIG. 32.
Figure 32:
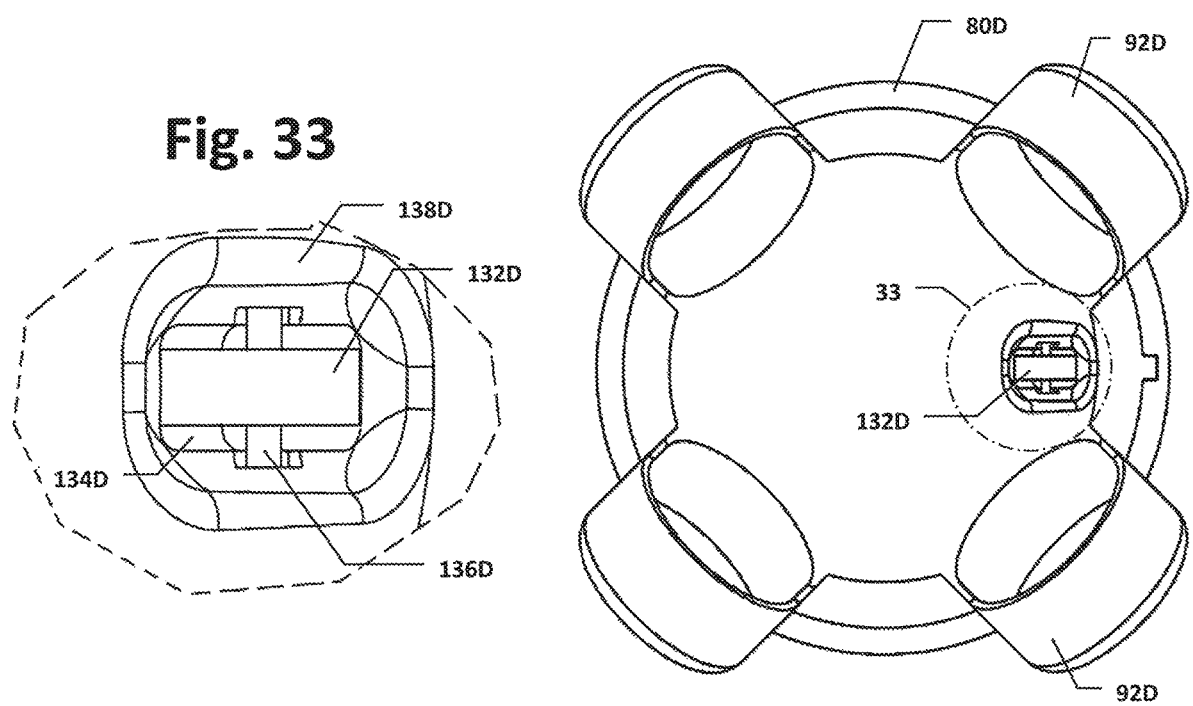
FIG. 32 is a bottom view of an upper section of the shell of the ball wheel of FIG. 31.

Nonetheless, in a further embodiment, referring to FIGS. 31-33, a ball wheel 14D incorporates a tracker wheel 132D rotatably mounted in a tracker recess 134D in the shell 32D and extending toward the ball 34D. Preferably, tolerances are such that, absent any force urging the ball 34D toward the tracker wheel 132D (e.g., the weight of an article 12D supported by the ball wheel 14D when inclined or horizontal), there is a slight gap between the ball 34D and the tracker wheel 132D. Advantageously, the tracker wheel 132D can be formed as a sealed, deep groove bearing, like the caster wheel 102A. The tracker wheel 132D is mounted with a fixed axis of rotation about an axle 136D, or other rotational mounting mechanism. The axle 136D is a x-axis generally parallel with the axis 54D about which the maximum angular extent 50D of the ball opening 36D extends.

Advantageously, the tracker wheel 132D is surrounded by a protrusion 138D surrounding the periphery of the recess 134D, which, like the central protrusion 118A, diverts any free bearings (like the bearings 94A, 94B, 94C)—and deflects any debris—therearound. In the depicted embodiment, the ball wheel 14D uses micro-casters 90D as bearing arrangement and the tracker wheel 132D is preferably positioned intermediate two of the micro-casters 90D and their seats 92D. However, it will be appreciated that a tracker wheel could be advantageously employed with other bearing arrangements, including any of the disclosed bearing arrangements.

Figure 34:
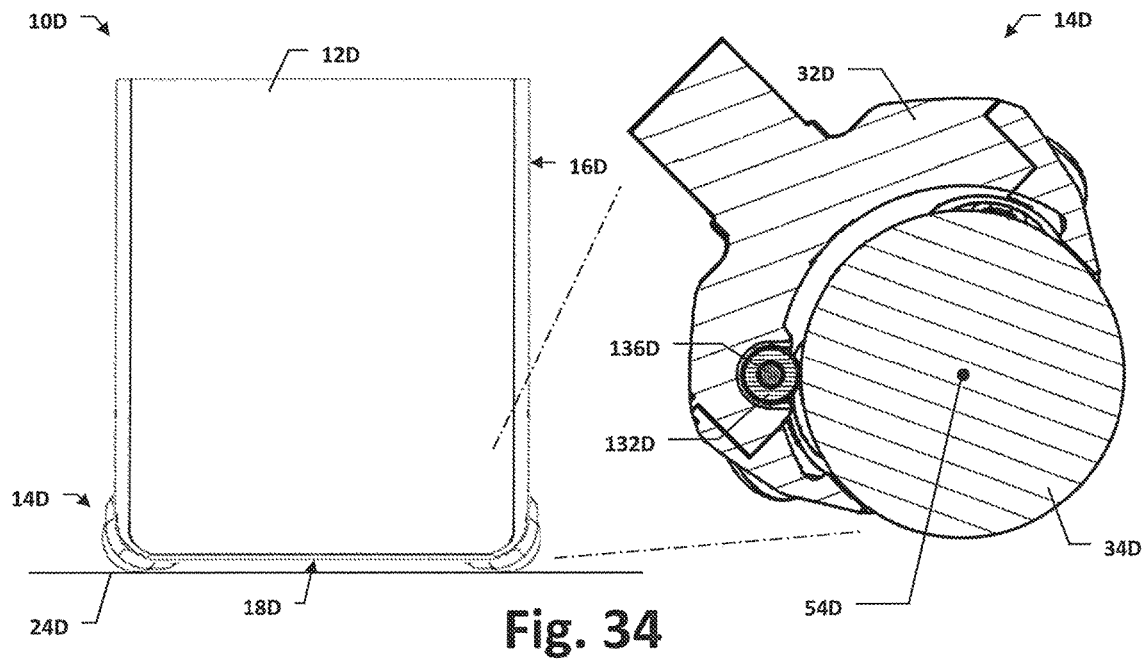
FIG. 34 is a side view of an article movement system, including the ball wheel of FIG. 31 attached to an article in a vertical orientation.

Referring to FIG. 34, the tracker wheel 132D is positioned so that its axle 136D (and hence the rotational axis thereof) is on a level with the x-axis 54D passing through the center of the ball 34D with the article 12D in the vertical orientation. In other words, the tracker wheel 132D is essentially to the side of the ball 34D. Gravity and the weight of the article 12D therefore do not urge the ball 34D into engagement with the tracker wheel 132D in the vertical orientation, such that the tracker wheel 132D essentially does not impact the movement of the ball 34D relative to the bearing arrangement 40D and the shell 32D.

Figure 35:
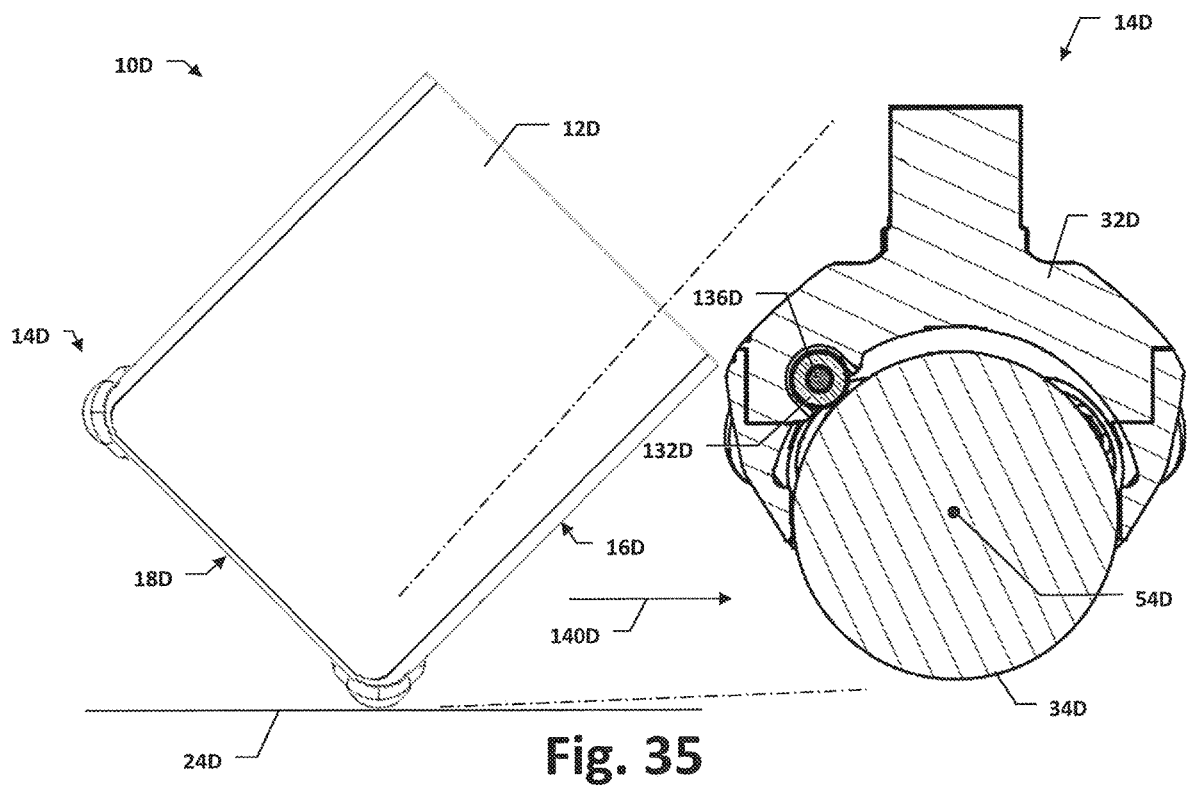
FIG. 35 is a side view of the article movement system of FIG. 34, including the ball wheel of FIG. 31 attached to the article in an inclined orientation.

Referring to FIG. 35, with the article 12D moved into an inclined orientation, the axle 136D of the tracker wheel 132D moves above the x-axis 54 Dof the ball 34D. Now gravity, the weight of the article 12D and the forces acting on the ball 34D as the article 12D is pulled in direction of arrow 140D all act to engage the tracker wheel 132D with the ball 34D. Frictional engagement with the tracker wheel 132D, which can only rotate about its axle 136D, now helps constrain the ball 34D in rotation about its x-axis 54D. Consequently, the straight line tracking of the article 12D when pulled in an inclined or horizontal orientation is enhanced. This is even the case when the article 12D is being pulled over a surface with a slope offset to either side of the desired direction of motion.

As discussed above, various additional functional components can be integrated into the ball wheel 14. For example, referring to FIGS. 36-39, a ball wheel 14E includes a suspension unit 146E and a brake unit 150E. The suspension unit 146E mounts between the neck 86E of the ball wheel 14E and the article 12E and absorbs bumps and shocks experienced by the ball wheel 14E as it passes over the underlying surface, thereby offering a smoother ride and reducing the likelihood of damage to components of the article 12E, ball wheel 14E or the associated structure. The brake unit 150E is mounted in an internal passage 152E extending axially through the neck 86E and is effective to apply a braking force to the ball 34E to slow or cease rotational movement thereof relative to the shell 32E.

Figure 41:
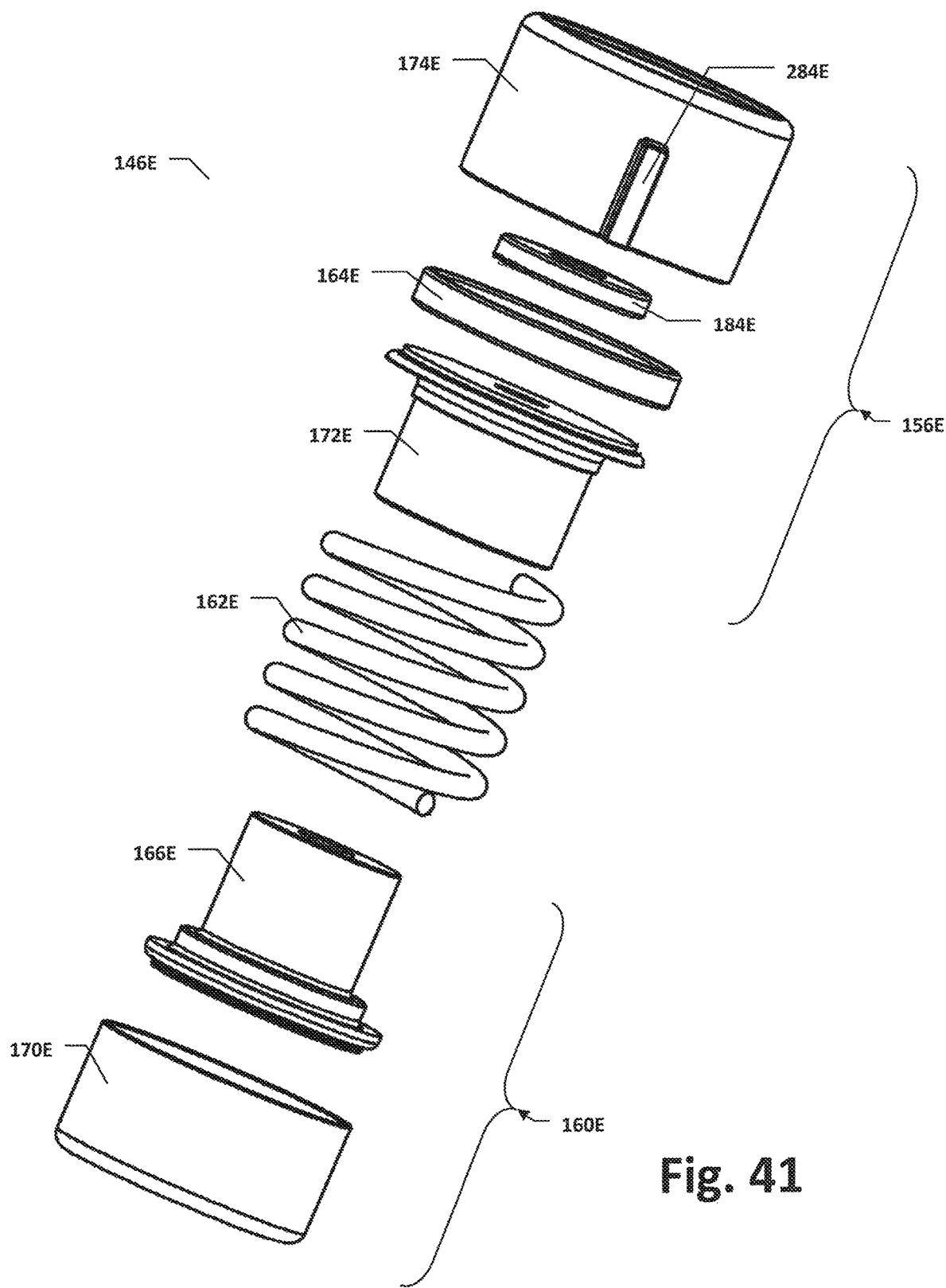
FIG. 41 is an exploded view of the suspension unit of the ball wheel of FIG. 36.

The suspension unit 146E, referring more particularly to FIGS. 40 and 41, includes upper and lower sections 156E, 160E that are slidable relative to each other, with the lower section 160E being seated on the shell 32E around the neck 86E. To regulate the relative motion of the upper and lower sections 156E, 160E, a compression spring 162E extends therebetween, and can be brazed, or otherwise connected, to the upper section 156E at the top and to the lower section 160E at the bottom. A retention ring 164E at the top of the spring 162E further enhances fit and connection.

For ease of assembly, the lower section 160E includes a lower spring seat 166E and an outer cover 170E. Likewise, the upper section 156E includes an upper spring seat 172E and an outer cover 174E. To facilitate smooth relative movement, a lubricant can be applied between the adjacent surfaces of the lower and upper spring seats 166E, 172E. The outer covers 170E, 174E can be attached after assembly of the spring seats 166E, 172E and the spring 162E, by brazing or other connection means.

Concentric bores 176E, 180E are defined through the spring seats 166E, 172E respectively to facilitate securing the ball wheel 14E to the article 12E, and for allowing retraction of the ball wheel 14E further within the article 12E, as will be explained further below. A cushioned dampener 184E, also with a concentric bore 186E, is arrayed between the spring seats 166E, 172E to prevent sharp impacts therebetween.

The brake unit 150E, referring more particularly to FIGS. 40, 42 and 43, is located in the internal passage 152E located within the neck 86E of the ball wheel 14E. The brake unit 150E includes a brake housing 190E from which a brake shoe 192E is extendable toward the ball 34E. The brake shoe 192E is connected via a brake rod 194E to a brake piston 196E. A cam operator 200E is operable via a brake cable 202E to urge the brake shoe 192E, via the rod 194E and piston 196E, toward the ball 34E. A tension spring 204E acts to retract the brake shoe 192E automatically when braking force is not applied via the cam operator 200E. Design tolerances are preferably such that, even with the spring 204E fully compressed, the brake shoe 192E will not completely exit the internal passage 152E—further ensuring proper brake shoe 192E alignment.

The brake housing 190E includes opposed slots 206E to allow a full range of motion of the cam operator 200E and an exit path for the brake cable 202E. A cam mounting sleeve 210E is received within the brake housing 190E having slots 212E aligned with the slots 206E. The cam mounting sleeve 210E mounts a cam axle 214E via axle notches 216E. The cable 202E is attached to an opposite end of the cam operator 200E via a cable axle 220E and bushing 222E.

When assembled, the brake unit 150E can simply be "plugged" into the internal passage 152E or removed with relative ease. A shoulder 224E on the housing 190E limits insertion to the proper distance via engagement with a corresponding constriction 226E in the internal passage 152E. A threaded plug 230E is threaded into the internal passage 152E, closing the neck 86E and holding the brake unit 150E in place. The plug 230E has an internal bore 232E. Hex surfaces or the like are formed on an upper portion of the bore 232E to facilitate insertion and removal of the plug 230E, while a lower portion of the bore 232E is threaded to facilitate connection of the ball wheel 14E to the article 12E (as described below).

When braking force is applied, the shoe 192E extends and applies braking force on the ball 34E by directly engaging the ball 34E. To improve engagement, a lower face 234E of the brake shoe 192E is contoured to match the curvature of the ball 34E. A peripheral edge 236E of the brake shoe 192E is advantageously curved to direct bearings 94E (and any debris) therearound. (A hex opening 240E extends into the lower face 234E to facilitate threading the shoe 192E/rod 194E into the cap 196E.) The ball wheel 14E can be configured such that the braking force exerted by the shoe 192E urges the ball 34E into contact with the peripheral lip 42E, further enhancing the effective braking action.

The clearance between the lower surface 234E of the shoe 192E and the ball 34E is preferably relatively small, which allows for quicker braking action with less shoe travel 192E and also minimizes fouling problems that might be engendered by a larger clearance. With a small clearance, high impact forces (e.g., when a heavily laden article 12E is rolled off a high curb) might cause sufficient relative movement between the brake shoe 192E and the ball 34E to result in unwanted braking action. In an alternate embodiment (see FIGS. 44 and 45), the brake shoe 192F has a plurality of bearings 242F embedded in lower face 234F via low friction seats 244F. The seats 244F are located within openings 246F extending into the face 234F (a hexagonal seat can be located within the hex opening 240F. The bearings 242F reduce the incidence and/or severity of unwanted braking action in high impact force scenarios.

Referring again to FIGS. 36 and 40, routing of the brake cable 202E out of the ball wheel 14E is facilitated by aligned cable openings 250E formed in the suspension unit 146E and the neck 86E of the shell 32E. The openings 250E in the suspension unit 146E include aligned openings in both the lower spring seat 166E and outer cover 170E of the lower section 160E. A cable notch 252E formed in the outer cover 174E of the upper section 156E ensures that compression of the suspension unit 146E will not interfere with the brake cable 202E.

Figure 46:
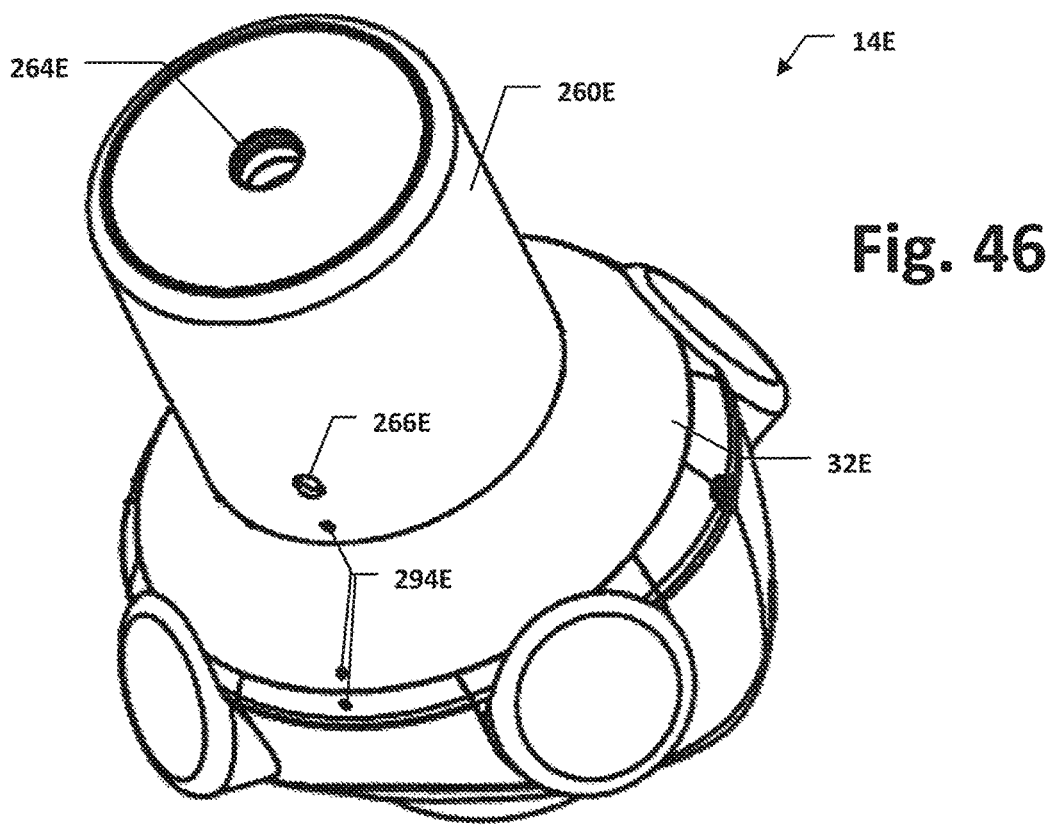
FIG. 46 is a perspective view of the ball wheel of FIG. 36, equipped with a suspension replacement unit and a brake replacement unit in lieu of the suspension unit and the brake unit.
Figure 47:
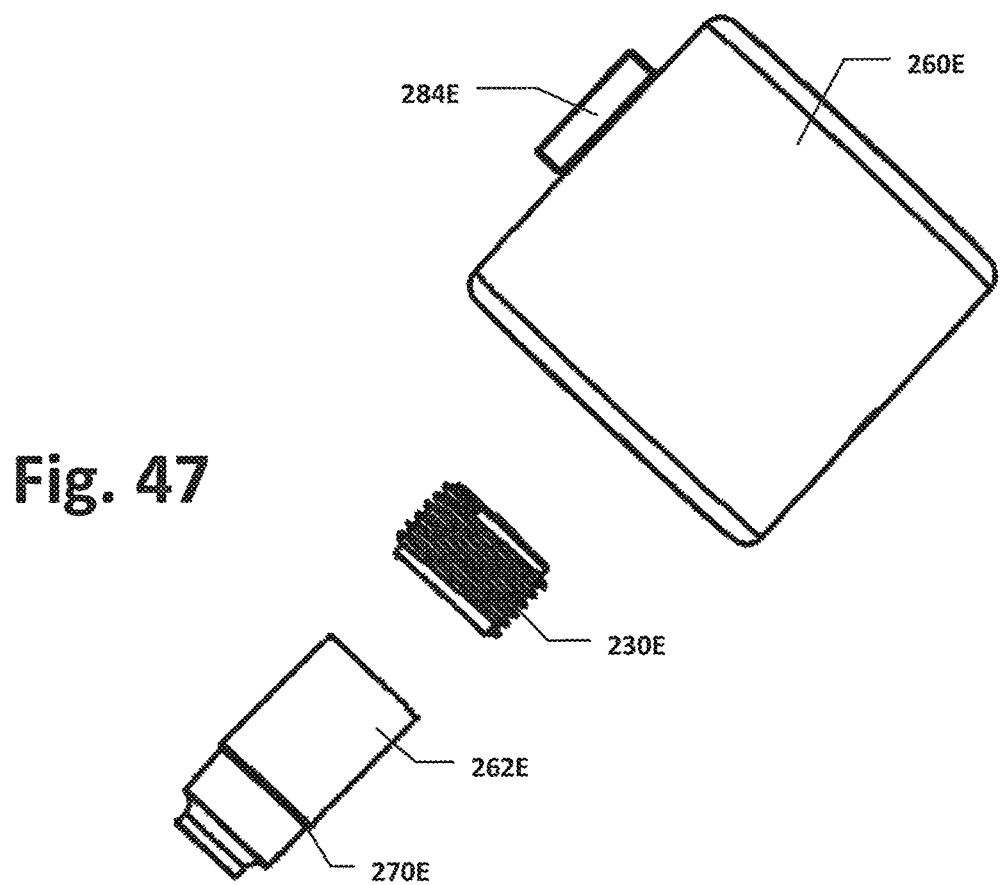
FIG. 47 is an exploded side view of the suspension replacement unit and the brake replacement unit of FIG. 46.

The modular design of the suspension unit 146E and brake unit 150E allow for easy upgrading, and "plug and play" usability of such units. For instance, referring to FIGS. 46 and 47, a more basic configuration of the ball wheel 14E is achieved by replacing the suspension unit 146E with a suspension replacement unit 260E and replacing the brake unit 150E with a brake replacement unit 262E. The replacement unit 260E fits over the neck 86E just like the suspension unit 146E, but lacks the internal suspension components. A concentric bore 264E is formed through the replacement unit 260E like the opening 176E, to allow attachment to the article 12 (explained below). Preferably, a cable opening 266E is formed through a side of the suspension replacement unit 260E, further enabling a ball wheel 14E configuration where a brake unit 150E is used without a suspension unit 146E.

Likewise, the brake replacement unit 262E is a unitary piece lacking braking components that seats in the internal passage 152E via a shoulder 270E and is secured in place by the threaded plug 230E just like the brake unit 150E. It will be appreciated that in yet another ball wheel 14E configuration, the brake replacement unit 262E could also be used with a suspension unit 146E.

Figure 48:
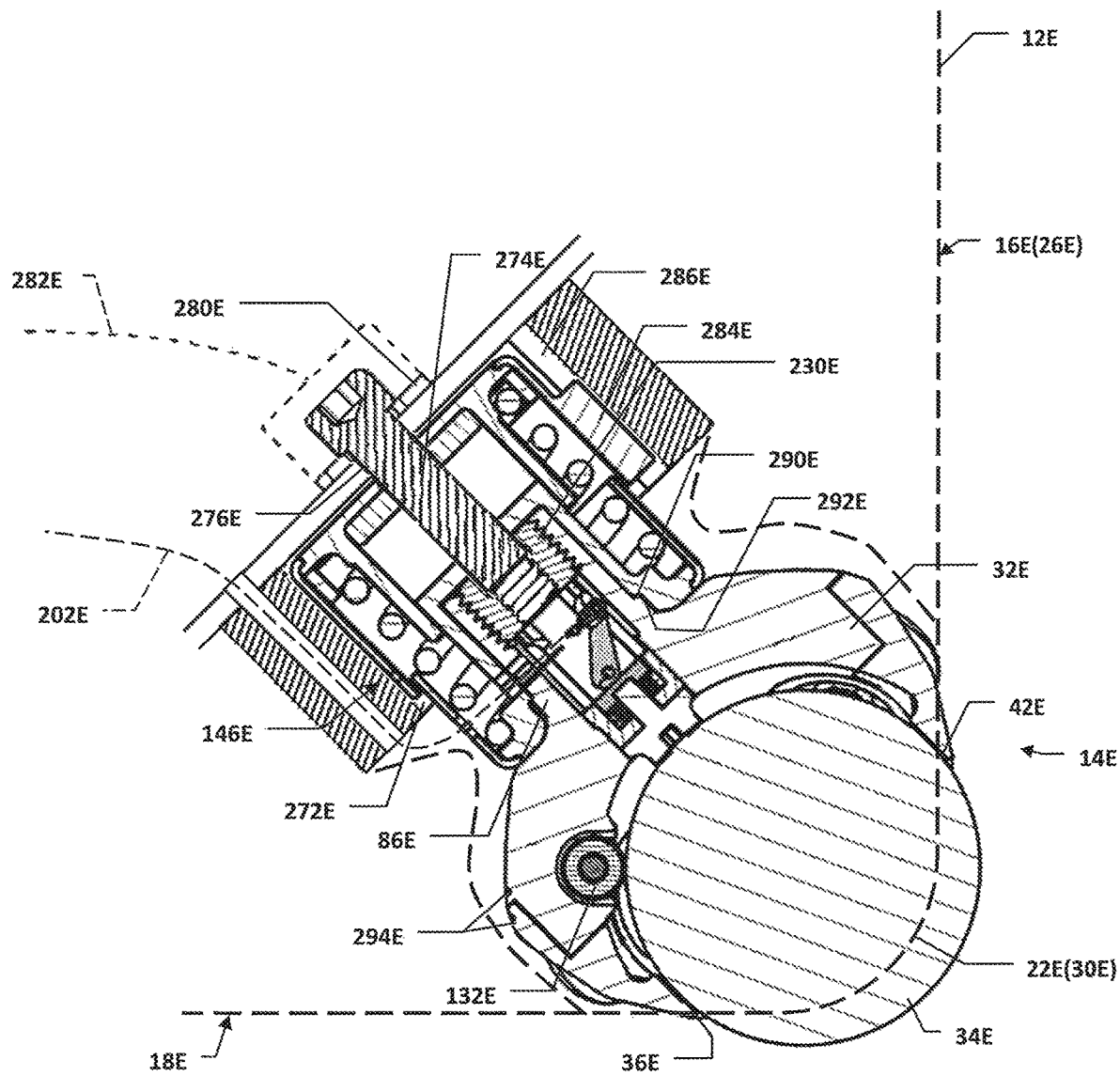
FIG. 48 is sectional view of the ball wheel of FIG. 36 incorporated into an article movement system.

Referring to FIG. 48, a socket 272E is formed along the edge 22E(30E) of the article 12E (preferably proximate the ends thereof—see, e.g., FIGS. 1 and 2) into which the neck 86E of the ball wheel 14E is received, along with attached suspension unit 146E (or suspension replacement unit 260E). A connecting bolt 274E is inserted from the interior of the article 12E through an opening 276E (and preferably also a washer 280E), and threaded into the plug 230E to secure the ball wheel 14E into the socket 272E. As the head of the connecting bolt 274E (and washer 280E) cannot pass through the opening 276E, the connecting bolt 274E also effectively delimits the maximum extension of the suspension unit 146E, when the ball wheel 14E is so equipped.

A retraction cable 282E is preferably routed through the interior of the article 12E along with the brake cable 202E. The retraction cable 282E allows the ball wheel 14E to be further retracted within the article 12E by compressing the suspension unit 146E via the cable 282E. Thus, the article 12E can require even less space when stowed. The routing of the brake and retraction cables 202E, 282E is depicted schematically. It will be appreciated that similar cables from each of the ball wheels 14E attached to the article 12E could be routed together to allow remote operation of all brake units 150E, and/or retraction of ball wheels 14E, simultaneously from a single point elsewhere on the article 12 (e.g., on a handle thereof).

To ensure proper alignment of the ball wheel 14E relative to the article 12E, indexing surfaces 284E, 286E are formed on the exterior of the suspension unit 146E (and suspension replacement unit 260E) and the interior of the socket 272E, respectively. To ensure proper alignment of the suspension unit 146E (and suspension replacement unit 260E) over the neck 86E, respective indexing surfaces 290E, 292E are also formed thereon. To ensure proper alignment of the upper and lower sections 80E, 82E (as well as suspension and suspension replacement units 146E, 260E), indexing marks 294E are formed thereon (see FIGS. 36 and 46). With all components indexed properly, the non-circular ball wheel opening 36E (and tracker wheel 132E) will be properly oriented relative to the article 12E when the ball wheel 14E is connected thereto.

In an exemplary implementation of the article movement system 10, the article 12E is sold with ball wheels 14E with the suspension replacement unit 260E and the brake replacement unit 262E. A user could later opt to upgrade to the suspension unit 146E and/or the brake unit 150E, and simply remove the ball wheels 14E from the article 12E by removing their respective connecting bolts 274E. With the ball wheels 14E detached, the suspension replacement unit 260E would be taken off, the threaded plug 230E removed, and the brake replacement unit 262E pulled out. The brake unit 150E would be installed, the threaded plug 230E replaced, the suspension unit 146E placed over the neck 86E, and each ball wheel 14E reattached via its connecting bolt 274E. Similarly, repair or replacement of damaged components is greatly facilitated.

The foregoing embodiments are provided for exemplary and illustrative purposes; the present invention is not necessarily limited thereto. For example, the features of the above-described embodiments are described separately for clarity of illustration; however, features of different embodiments are readily combinable. For instance, any of the ball wheels 14-14E can be used in the system 10 with the article 12. Likewise, the suspension and brake units 146E, 150E (as well as respective replacement units 260E, 262E) of the ball wheel 14E could be integrated into any of the ball wheels 14-14D; the tracker wheel 132D-132E of the ball wheels 14D-14E could be integrated into any of the other ball wheels 14-14C; and so on.

Different numbers of ball wheels 14-14E could be used on an article 12 than shown. For example, more or fewer ball wheels 14 could be placed along edges 22, 30. Ball wheels 14 could be placed on other edges, such as top edges of an article 12. Ball wheels 14 could be placed on fewer edges; e.g., only along a single edge, with a more basic rolling support on other edges. Differently configured ball wheels 14 could be used on different edges. For instance, ball wheels 14 on edge 22 could be equipped with brake and suspension units, while ball wheels 14 on edge 30 could be equipped with replacement units. An article 12 could be configured to receive the neck 86 of a ball wheel 14 directly without an intervening suspension or replacement unit.

Additionally, any suitable construction materials can be employed for the ball wheels; the present invention is not necessarily limited with respect thereto. Stainless steel, titanium, carbon fiber reinforced polymers and high strength plastics are advantageous for the ball wheels and housings. To minimize noise while rolling, as well as the generation of static electricity, balls in the ball wheels are preferably coated with a polyurethane or similar shell and may have a hard plastic core, or be a solid ball.

As used in the context of the claims, ball wheels are "substantially identical" if they include all of the same elements recited in the claim in which they are both/all recited—including elements recited directly in such claim, as well as elements incorporated as a result of dependence. "Substantially identical" ball wheels could still differ with respect to elements not recited.

The present inventor has previously filed patent applications disclosing various embodiments of ball wheels and uses therefor, including: U.S. Patent Application Ser. No. 61/139,153, filed on Dec. 19, 2008; Ser. No. 12/641,845, filed on Dec. 18, 2009; Ser. No. 12/718,063, filed on Mar. 5, 2010; Ser. No. 61/789,101, filed on Mar. 15, 2013; Ser. No. 61/792,217, filed on Mar. 15, 2013; Ser. No. 14/215,814, filed on Mar. 17, 2014; Ser. No. 14/215,854, filed on Mar. 17, 2014; and Ser. No. 62/106,836, filed on Jan. 23, 2015, the contents of which applications are herein incorporated by reference in their entirety. To the extent such features and uses are not expressly disclosed herein, it will be appreciate that they could readily be incorporated into the various ball wheel embodiments disclosed herein.

The foregoing is not an exhaustive list of variations. Rather, those skilled in the art will appreciate that these and other modifications and adaptations are possible within the scope of the invention as herein shown and described and of the claims appended hereto.

What is claimed is:

1. An article movement system comprising:
   an article having first and second article surfaces meeting at a first article edge;
   a first ball wheel located along the first article edge, the first ball wheel including:
     a ball for engaging an underlying surface;
     a bearing arrangement for supporting the ball for omni-directional rotational movement;
     a shell located along the first article edge and containing the ball and the bearing arrangement, the shell defining a non-circular ball opening through which a portion of the ball extends so as to be able to contact the underlying surface;
   wherein the article, the bearing arrangement and the shell are configured such that the ball wheel is able to support the article for omni-directional rolling motion over the underlying surface with the first article surface parallel thereto, the second article surface parallel thereto, and at any orientation therebetween.

2. The article movement system of claim 1, wherein the non-circular ball opening has a major angular extent and a minor angular extent, the major angular extent being greater than the minor angular extent.

3. The article movement system of claim 2, wherein the first article edge extends generally along an edge x-axis and the ball rotates about a ball x-axis when the article is rolled along the underlying surface in the direction of a z-axis, the major angular extent extending partially around the ball x-axis, the minor angular extent extending partially around a ball z-axis intersecting the ball x-axis.

4. The article movement system of claim 3, wherein the major angular extent is greater than approximately 90 degrees relative to the ball x-axis and the minor angular extent is less than approximately 160 degrees relative to the ball z-axis.

5. The article movement system of claim 4, wherein the major angular extent is between approximately 120 degrees to approximately 200 degrees and the minor angular extent is between approximately 60 degrees to approximately 135 degrees.

6. The article movement system of claim 1, wherein a peripheral lip extends toward the ball around the non-circular ball opening.

7. The article movement system of claim 6, where an outer portion of an inner face of the peripheral lip has a radius of curvature equal to a radius of curvature of the ball.

8. The article movement system of claim 6, wherein a spacing between the ball and the inner face of the peripheral lip is greater at an inner edge of the peripheral lip than at an outer edge of the peripheral lip.

9. The article movement system of claim 6, wherein the peripheral lip is magnetized.

10. The article movement system of claim 1, wherein the bearing arrangement includes a plurality of micro-casters engaging the ball from within the shell.

11. The article movement system of claim 10, wherein each of the plurality of micro-casters includes:
    an outer housing mounted to the shell;
    an inner housing rotatably mounted within the outer housing; and
    a caster wheel rotatably mounted in the inner housing such that a rotational axis of the caster wheel extends at a right angle to, but does not intersect, a rotational axis of the inner housing.

12. The article movement system of claim 11, wherein each of the plurality of micro-casters further includes a plurality of ball bearings rotatably supporting the inner housing relative to the outer housing.

13. The article movement system of claim 11, wherein each of the plurality of micro-casters further includes a cap fixed to and rotatable with the inner housing, the cap defining a caster wheel opening through which a portion the caster wheel extends.

14. The article movement system of claim 13, further comprising a sealing ring surrounding the cap and enclosing a space between the inner and outer housings;
    wherein the cap and the sealing ring are contoured to continue a curvature of an inner surface of the shell adjacent thereto, except for a central protrusion of the cap extending around the caster wheel opening.

15. The article movement system of claim 10, wherein the plurality of micro-casters includes four micro-casters, each of the four micro-casters positioned to engage a respective one of four quadrants of the ball.

16. The article movement system of claim 15, wherein the non-circular ball opening has a major angular extent and a minor angular extent, the four quadrants being formed therebetween.

17. The article movement system of claim 15, wherein the four micro-casters are positioned for dual engagement.

18. The article movement system of claim 10, wherein the bearing arrangement further includes a plurality of ball bearings arranged in a bearing volume between the ball and the shell, the plurality of ball bearings being free to circulate therethrough around and over the micro-casters.

19. The article movement system of claim 1, wherein the bearing arrangement includes a plurality of ball bearings arranged in a bearing volume between the ball and the shell, the plurality of ball bearings being free to circulate therethrough.

20. The article movement system of claim 19, wherein the bearing arrangement further includes a bearing well defined in the shell and communicating with the bearing volume such that a portion of the plurality of ball bearings can freely circulate into and out of the bearing well.

\* \* \* \* \*